(12) United States Patent
Smith

(10) Patent No.: US 8,025,304 B2
(45) Date of Patent: Sep. 27, 2011

(54) DRIVE MECHANISMS FOR HUMAN-POWERED MACHINES

(76) Inventor: Robert M. Smith, Richmond (AU)

( * ) Notice: Subject to any disclaimer, the term of this patent is extended or adjusted under 35 U.S.C. 154(b) by 832 days.

(21) Appl. No.: 11/696,516

(22) Filed: Apr. 4, 2007

(65) Prior Publication Data

US 2007/0182122 A1    Aug. 9, 2007

(30) Foreign Application Priority Data

Oct. 26, 2004   (AU) ................................ 2004906184
Oct. 26, 2005   (WO) ................ PCT/AU2005/001660

(51) Int. Cl.
*B62M 1/02* (2006.01)

(52) U.S. Cl. ....... 280/259; 280/260; 74/594.1; 74/594.3

(58) Field of Classification Search .................. 280/259, 280/275, 283, 249, 260; 74/594.3, 594.1
See application file for complete search history.

(56) References Cited

U.S. PATENT DOCUMENTS

| | | | | |
|---|---|---|---|---|
| 4,029,334 A * | 6/1977 | Trammell, Jr. | ................ | 280/261 |
| 4,331,043 A * | 5/1982 | Shimano | ...................... | 74/594.2 |
| 4,358,967 A * | 11/1982 | Kastan | ........................ | 74/594.2 |
| 4,704,919 A * | 11/1987 | Durham | ...................... | 74/594.1 |
| 4,816,009 A * | 3/1989 | Philipp | ........................... | 474/69 |
| 5,493,937 A * | 2/1996 | Edwards | ...................... | 74/594.1 |
| 5,533,741 A * | 7/1996 | Matsuo | ......................... | 280/238 |
| 5,653,150 A * | 8/1997 | Gignoux | ...................... | 74/594.1 |
| 5,755,635 A * | 5/1998 | Scaramozzino | .............. | 474/150 |
| 5,782,713 A * | 7/1998 | Yang | .............................. | 474/160 |
| 5,860,329 A * | 1/1999 | Day | .............................. | 74/594.1 |
| 6,367,352 B1 * | 4/2002 | Niculescu | .................... | 74/594.1 |
| 6,393,939 B1 * | 5/2002 | Yamanaka | ................... | 74/594.1 |
| 6,543,308 B2 * | 4/2003 | Harrington | ................. | 74/594.2 |
| 6,899,402 B2 * | 5/2005 | Chiang et al. | .............. | 301/124.2 |
| 2003/0097900 A1 * | 5/2003 | Yamanaka | .................... | 74/594.1 |
| 2003/0097901 A1 * | 5/2003 | Yamanaka | .................... | 74/594.1 |

* cited by examiner

*Primary Examiner* — Joanne Silbermann
*Assistant Examiner* — Maurice Williams
(74) *Attorney, Agent, or Firm* — Vedder Price P.C.

(57) ABSTRACT

An improved power transfer mechanism for use on a human-powered machine, adapted to be drivingly connected to a power take-off device of said machines, includes: a housing adapted in use, to be disposed within a frame of said human-powered machine; at least one crankshaft adapted to be disposed within said housing; respective left-side and right-side crank arms each adapted to be drivingly associated with an end of said at least one crankshaft; and drive transfer means adapted to co-operate with said at least one crankshaft and each associated crank arm, the arrangement being such that a first member of the group comprising and left-side and right-side crank arms and said power take-off device is adapted to be attached to said at least one crankshaft, such that each of the second and third of said members is adapted to be rotatable relative to said first of said members, and each other, only to a limited and controlled degree, whilst not be movable axially or in a longitudinal direction relative to said at least one crankshaft.

6 Claims, 16 Drawing Sheets

DRIVE MECHANISMS FOR HUMAN-POWERED MACHINES

FIELD OF THE INVENTION

The present invention relates, in general terms, to an improved power transfer means or drive mechanism for a human-powered machine, as for example a bicycle. More particularly, but not exclusively, the invention relates to an improved drive mechanism which, if correctly utilised by the rider/user, will allow for an improved pedalling technique and/or the maintenance of an optimum pedalling technique, with a resultant improvement in function or operation of the human-powered machine itself.

These days cycles, whether bicycles of the mobile type or cycles of the stationary/exercise type, are enjoying usage on an ever-increasing scale, for both sporting and recreational pastimes or for general health purposes. Throughout the ensuing description reference will be made to a particular and preferred embodiment or context of usage of the present invention, namely in a bicycle of the on-road or mobile type. It should be understood, however, that the present invention is equally suited for use in stationary or exercise-type cycles, in fact in any type of cycle which relies on human power.

When a bicycle is used, whether for recreational or competitive purposes, experience has shown that, in order to maximise power and efficiency in propelling or operating any such bicycle, the cyclist should wear a shoe with a cleat that is adapted to be firmly attached to a pedal, and to adopt a pedalling technique wherein each leg applies torque in such a way that it contributes only to the forward motion of the bicycle or, in the case of a stationary or exercise type cycle, to the speed of rotation of the driven wheel. If such a pedalling technique is not employed and/or maintained, then energy is being wasted by the cyclist and the equipment is not being used at maximum effectiveness. This will result in inefficiency of operation and, ultimately, may even give rise to an undue degree of tiredness for the cyclist. For competitive cyclist, or even when the bicycle is being used purely for recreational purposes, this will mean that the desired standard can be either not reached and/or not maintained. For a stationary or exercise type cycle, this will mean that the preferred maximum benefit is not obtained.

Whilst all cyclists, and especially competitive cyclists, understand the importance of adopting the correct pedalling technique, doing just that in practice, and especially over an extended period of time, has been found to be extremely difficult. To maintain the correct and optimum pedalling technique over any significant period of time requires immense powers of concentration on the part of the cyclist, so as to ensure that the cyclist always uses leg muscles in such a way as to ensure that any force generated acts tangentially to the crank. As tiredness sets in, for example as a result of pedalling over an extended period of time, and/or a great distance there will be a tendency for the pedalling technique to become less than ideal. Indeed with an inexperienced cyclist, and even with an experienced cyclist suffering from fatigue, it has been found that there can regularly occur (to differing degrees dependent upon the experience of the cyclist) what shall hereinafter be referred to as a "dead point" in the pedalling technique. In that regard such a dead point can be considered, for purposes of this specification, as being that arc, or angular degree of travel, of crank revolution during the course of which the cyclist is not applying torque that is sufficiently large to contribute to the forward or propelling motion of the bicycle itself.

THE PRIOR ART

What are herein referred to as conventional bicycles have two diametrically opposed cranks or crank members which are in themselves directly connected to a common crank spindle or shaft. Mounted on one of those cranks are the chain rings or drive mechanism. The arrangement is such that power or torque generated from the cyclist's legs is transferred to the cranks through the pedals, which can come in various forms. With the standard flat pedal, power can only be applied to the crank by the downward pushing action of each leg, with the leg that is not pushing downwards being lifted upwards as a result of force being applied to the opposite crank. To enable leg muscles to be utilised that can also apply an upward as well as a horizontal force to the pedalling action, there have been utilised two common pedal types. A first type has a bracket which attaches to the pedal by means of a strap that can be pulled tight to secure the foot of the cyclist. With this system, unless the foot or cycling shoe is very firmly fastened to the pedal by the strap, it is prone to slip out under high levels of rearward or upward force. The other pedal type is the contemporary system which requires the cyclist to wear a special cycling shoe which firmly attaches to the pedal by means of a cleat or the like.

A significant amount of research and experimentation has been done on the biomechanics of pedalling, and many attempts have been made to avoid dead points, as for example by continuously altering the position of the pedal along the length of the crank arm during each revolution, or by the use of oval or elliptically shaped chain rings. The basic principle of operation of these systems has been to reduce the inertia of the crank in the region of the top and bottom parts of the revolution, this by reason of the fact that the human leg muscles are not naturally strong through this region and can become tired very quickly. However by reducing the inertia, the cyclist avoids the physical effort needed to overcome dead points, therefore does not build up the relevant muscles, and thereby reduces the potential power that could be applied to the cranks. Also, if the bicycle is travelling at a constant speed the cyclist's leg will be speeding up and slowing down dependent on which point of the revolution they are at, a situation which has been found to not feel natural. It is a more natural action to pedal at a constant angular velocity, but this will cause the bicycle to be subject to surging and slowing during every crank revolution.

In accordance with the known art a number of methods and means have been employed in an attempt to eliminate the occurrence of such a dead point.

However, one of the problems regularly experienced has been with actual identification of the occurrence or onset of such a dead point. With a conventional crank system for a bicycle, for instance, the leg of the cyclist experiencing any dead point is, to all intents and purposes, being carried or supported during its motion by the other leg of the cyclist and/or the momentum or impetus of the rotating crank assembly itself. Such has meant that, with conventional crank systems for bicycles, it has been difficult for the cyclist to actually detect the occurrence of a dead point, let alone try to compensate therefor, this especially when the legs have become fatigued or, in the alternative, when tiredness leads to a lapse in concentration and a variation in the pedalling technique.

A primary object of the invention is not to avoid dead points, a result which has been found to be extremely difficult, if not actually impossible, to achieve. Rather the present invention seeks to provide a method and means for alerting the cyclist as to the existence of a dead point, indicating to the cyclist that the pedalling technique then being employed is not as it should be, and calling for the application of additional torque and/or an improvement in actual technique.

The principle of operation of the invention is that each crank arm (or pedal) must be able to rotate to a limited extent relative to the power take-off element of the overall apparatus, for example the chain rings. Such can be achieved in a variety of ways, including:

(a) by immovably attaching the power take-off means to the crank spindle, and utilizing an arrangement/means such that each crank arm can rotate to a limited extent relative to the crank spindle (and in turn to the immovably attached power take-off means);

(b) by having one crank arm immovably attached to the crank spindle; the power take-off means interconnected for rotation to a limited extent relative to the crank spindle (and as such the immovably attached one crank arm); and with the other crank arm interconnected with the power take-off means for rotation relative thereto to a limited extent;

(c) by having each crank arm formed from a plurality of separate sections hinged together to allow for relative movement therebetween to a limited extent; and/or (d) by having each pedal-receiving means mounted to its respective crank arm in such a way as to allow that pedal-receiving means to move substantially tangentially relative to the crank arm and to be movable relative to the crankshaft to said limited extent (with the power take-off means being fixedly and immovably attached to or integrated with one of the crank arms.

With options (a) and (b) above, a first member of the group made up of left crank arm, right crank arm and power take-off may be immovably attached to the crank spindle, with the remaining members of said group being interconnected with the first member such that each is rotatable to a limited extent relative to the first member, as well as to each other.

In accordance with the invention the or each crank arm (or associated pedal) is adapted so as to be able to rotate, albeit only to a limited and controlled degree, relative to a crankshaft to which a power take-off means or element is attached substantially immovable. With such an arrangement, and if properly utilized by the cyclist, the result will be improved pedalling efficiency and, ultimately, increased power transfer to the cranks, in consequence giving rise to increased speed over the ground—in a mobile type bicycle—or increased speed of rotation of the wheel—with a stationary or exercise-type cycle. In other words, the or each crank arm (or pedal) is adapted to be rotatable, but only to a limited and controlled degree or extent—relative to the power take-off element of a bicycle. Conventionally, such a power take-off element will be made up of the chain 30 rings.

In one aspect the present invention provides an improved power transfer mechanism for use on a human-powered machine, said mechanism being adapted to be drivingly connected to a power take-off device of said machine, said machine being a bicycle having a crankshaft or spindle disposed within a frame and a crank arm associated with each free end of said crankshaft, wherein at least one of said crank arms is adapted to be able to rotate to a limited extent relative to said crankshaft.

In another aspect the present invention provides an improved drive mechanism for a bicycle or the like, said mechanism including: a crank spindle and a housing therefor, said crank spindle being adapted to be mounted within said housing for rotation relative thereto; a power take-off means attached to said crank spindle; a pair of crank members each adapted in use to be disposed adjacent an end of said crank housing and said crank spindle; and means adapted to be disposed between each crank member and the associated end of said crank spindle, the arrangement being such that said means and said crank spindle are interconnected in such a way as to be relatively rotatable to only a limited extent as a consequence of operation of said crank members, whilst not being movable axially or in a longitudinal direction relative to one another.

The invention further provides an improved power transfer mechanism for use on a human-powered machine, as for example a bicycle or the like, said mechanism being adapted to be drivingly connected to a power output device of said machine, said mechanism including: a housing for a crankshaft, said housing being adapted in use to be disposed within a frame of said machine; a crankshaft disposed for rotation within said housing; at least one rotary drive element adapted to be associated with said crankshaft for rotation therewith; opposed respective left side and right side crank arms drivingly associated with opposed ends of said crankshaft; and a drive transfer means adapted to be interposed between each opposed end of said crankshaft and the associated crank arm, the arrangement being such that said drive transfer means and said crankshaft are interconnected in such a way as to be relatively rotatable to only a limited extent as a consequence of operation of said crank arms, whilst not being movable axially or in a longitudinal direction relative to one another.

The invention also provides an improved power transfer mechanism for use on a human-powered machine, said mechanism being adapted to be drivingly connected to a power take-off device of said machine, said mechanism including: a housing adapted in use, to be disposed within a frame of said human-powered machine; at least one crankshaft adapted to be disposed within said housing; respective left-side and right-side crank arms each adapted to be drivingly associated with an end of said at least one crankshaft; and drive transfer means adapted to co-operate with said at least one crankshaft and an associated crank arm, the arrangement being such that one member of said left-side and right-side crank arms and said power take-off device is adapted to be attached to said at least one crankshaft, such that each of the second and third of said members is adapted to be rotatable relative to said first of said members, and each other, only to a limited and controlled degree, whilst not being movable axially or in a longitudinal direction relative to said at least one crankshaft.

In accordance with yet a further aspect of the invention there is provided an improved drive mechanism for a bicycle or the like, said mechanism including: a crank spindle, adapted in use to be disposed between opposed, spaced-apart crank members; and means adapted, in use, to be disposed intermediate said crank members and the associated end of said spindle, the arrangement being such that said means and said spindle are interconnected in such a way as to be relatively rotatable to only a limited extent as a consequence of operation (as by rotation) of said crank members, whilst not being movable axially or in a longitudinal direction relative to one another.

In accordance with another aspect of the present invention there is provided a method and means which allows a cyclist to better detect the occurrence of a dead point (as hereinbefore defined) during riding/pedalling of a bicycle or the like human-powered machine.

In accordance with a further aspect of the invention there is provided a method and means which enhances or accentuates the occurrence/effect of a dead point in the propulsion of a bicycle or the like human-powered machine, wherein there exists, at occurrence of a dead point, a limited degree of relative angular or rotational movement between the or each crank member (or pedal) and the associated power take-off means.

The invention further provides a bicycle including: a frame including means for releasably retaining a crankshaft or spindle; respective left and right crank arms adapted to have pedals or the like means associated therewith; and a power take-off means, the arrangement being such that each crank arm (or associated pedal) is adapted to be rotatable relative to said power take-off means to a limited extent.

In another aspect of the invention there is provided a method which allows for the detection of the onset of a dead point in the operation of a human-powered machine, said machine including a crankshaft or spindle, respective left and right crank arms and a power take-off means, wherein one of the group consisting of said crank arms and said power take-off means is fixedly attached to said spindle, with the remaining members of said group being interconnected with said one member such that each is rotatable to a limited extent relative to said first member and each other.

DESCRIPTION OF THE DRAWINGS

In order that the invention may be more clearly understood and put into practical effect reference will now be made to preferred embodiments of an improved mechanism in accordance with the present invention. The ensuing description is given by way of non-limitative example only and is with reference to the accompanying drawings, wherein.

DESCRIPTION OF PREFERRED EMBODIMENTS

Figure 1:
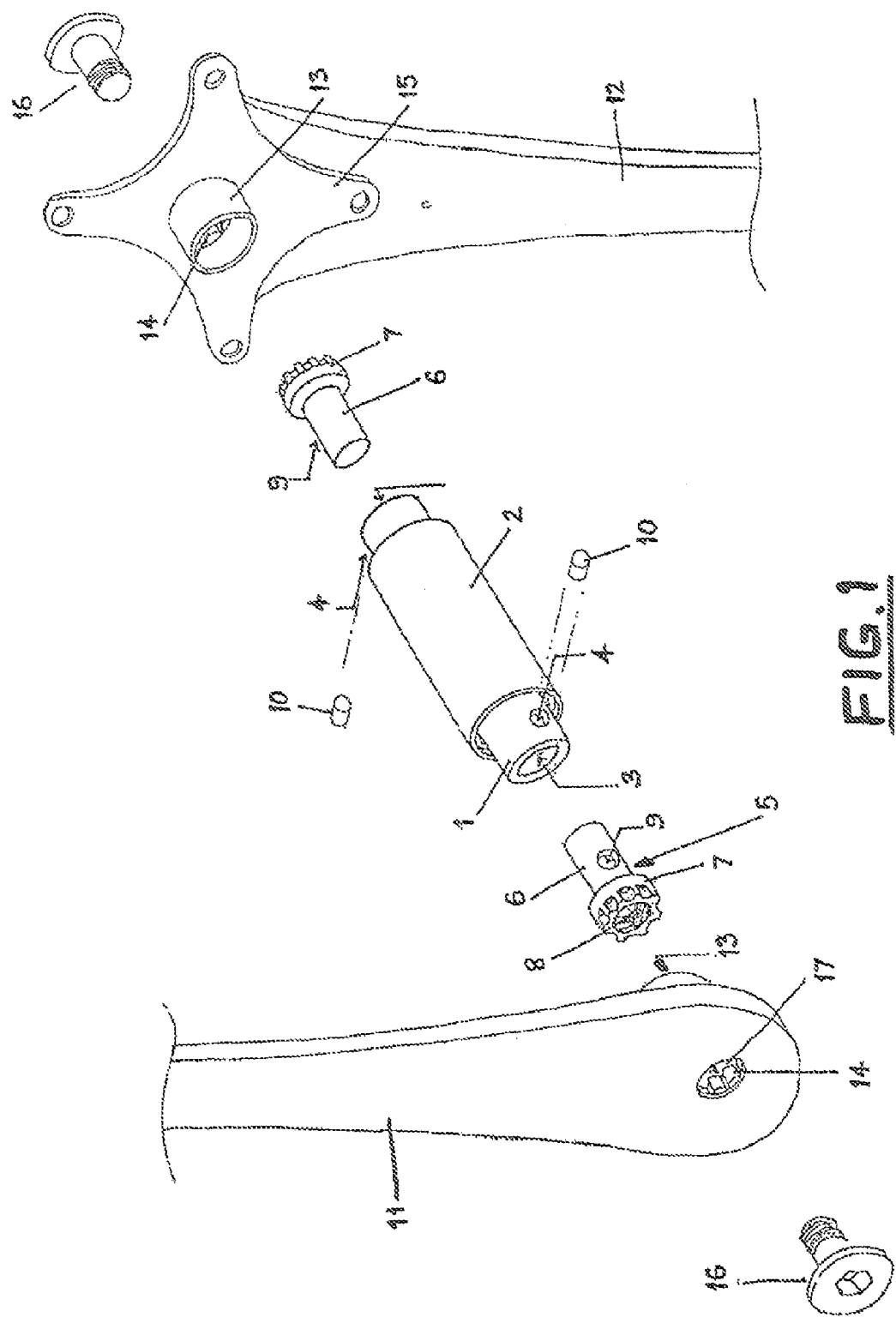
FIG. 1 is an exploded view of a first embodiment of a mechanism in accordance with the invention.

With reference firstly to the embodiment of FIG. 1, the arrangement shown therein includes a crankshaft or spindle 1 which is disposed longitudinally or axially within a crank spindle housing 2 and protrudes from each end thereof (as shown). In an especially preferred embodiment low friction bearings of any known type (not shown) may be employed to support the spindle 1 within the housing 2 and to allow for smooth relative rotation therebetween.

In this embodiment the crankshaft or spindle 1 is in the form of a substantially cylindrical member having bores or hollow sections 3 formed in each free end thereof. Displaced from each free end of the crank spindle 1, and at a predetermined location therealong and extending substantially radially thereinto, is an aperture or recess 4 which extends into the associated hollow section 3, for a purpose to be explained hereinafter.

In this embodiment there are provided respective left and right stub axles or drive transfer means 5, each of which includes a shaft 6, of a substantially cylindrical shape in cross-section and of a diameter only slightly less than, in fact complementary to, that of the bore or hollow section 3 of the spindle 1, and an externally splined head portion 7 which is internally threaded as at 8. Each stub axle 5 includes an aperture or recess 9 extending substantially radially of the shaft 6 thereof and transversely thereof. In an especially preferred embodiment the recess 9 will extend into the shaft 6 of the stub axle 5 only to a limited extent, in fact not extending across the entire diameter thereof. However, in an alternative embodiment the recess 9 could be in the form of an aperture which does extend across the entire diameter of the shaft 6 of stub axle 5. The arrangement is such that the shaft 6 of the stub axle 5 is adapted to be received within the associated bore or hollow section 3 of the crank spindle 1, in such a way that there can be no relative axial movement between stub axle 5 and spindle 1. A pin or the like member 10 is located within both the aperture or recess 4 of the spindle 1 and the mating aperture or recess 9 of the stub axle 5.

In accordance with the invention the aperture or recess 9 of the stub axle 5 is of the same dimension, in the direction of the longitudinal axis of both the stub axle 5 and the crank spindle 1, as the corresponding dimension of both the aperture or recess 4 of the crank spindle 1 and the pin or the like member 10, whereby to prevent any relative axial movement between the stub axle 5 and crank spindle 1. However, in the circumferential direction the aperture or recess 9 of the shaft 6 of the stub axle 5 is of a slightly larger dimension than that of both the aperture or recess 4 of the crank spindle 1 and the pin or the like member 10. In such a way, whilst longitudinal or axial movement between stub axle 5 and crank spindle 1 will not be possible, a limited degree of relative radial movement will be possible there-between. The difference in circumferential dimension or extent of the aperture or recess 9, as compared with that of the aperture or recess 4, may be varied in accordance with the invention. In an especially preferred embodiment the different dimensions will allow for a maximum of two degrees relative rotational movement between the stub axle 5 and crank spindle 1.

In the drawing there are shown respective left and right crank members or arms 11, 12, to each of which can be mounted, in any known manner and using any known means, a pedal or the like driving means (not shown). The means for mounting a pedal to crank members 11,12 is not of the essence of the invention. The crank members 11,12 each include a sleeve 13, preferably formed integrally therewith. The internal diameter of the sleeve 13 will be substantially the same as that of the crank spindle 1. A series of splines 14 will be provided internally of each sleeve 13. In the preferred embodiment illustrated the right crank member 12 will include a mounting flange or spider 15, onto which chain rings and/or a drive mechanism (not shown) may be mounted in accordance with known practices.

The arrangement is such that the crank spindle 1 and associated housing 2 are mounted in a frame of or for a bicycle. The aforementioned friction bearings (not shown) allow the spindle 1 to freely rotate relative to the housing 2 whilst bearing loads/forces applied to it by the cyclist through the crank members 11,12.

The shaft 6 of each stub axle 5 is adapted to be located within the associated bore or hollow section 3 of the spindle 1. The splined head portion 7 of the stub axle 5 then co-operates with the splined section 14 of the associated sleeve 13 of the relevant crank members 11,12. A retaining bolt or the like threaded member 16 may then be employed to fix the stub axles 5 relative to the crank members 11,12. The threaded member 16 extends in turn through an aperture 17 provided in each crank member 11,12, then into the threaded portion 8 of the splined head portion 7 of the associated stub axle 5, whereby to secure the various elements of the overall assembly together in an operating configuration.

The arrangement is such that, when the pin member 10 is inserted through the aperture or recess 4 of the spindle 1, and into the aperture or recess 9 of the stub axle 5, then whilst the stub axle 5 will be allowed a pre-determined degree of angular rotation relative to the spindle 1, it will be prevented from moving axially relative to said spindle 1. In an especially preferred embodiment the pin member 10 will be manufactured (sized) such that, when fully inserted into the apertures or recesses 4 and 9, the surface of the outer end thereof lies substantially flush with the outer surface of the spindle 1.

With the shafts 6 of left and right stub axles 5 inserted into each respective hollow section 3 of the crank spindle 1, and pin 10 inserted through aperture or recess 4 into the aperture or recess 9 of the stub axle 5, crank members 11,12 may be married up to this assembly by sliding sleeve 13 over hollow end section 3 and engaging the integrated splines 14 of the respective crank members 11,12 with the splined head 7 of stub axles 5, so that the crank members 11,12 are disposed at substantially 180 degrees to one another, as is the normal practice with bicycles.

Figure 2:
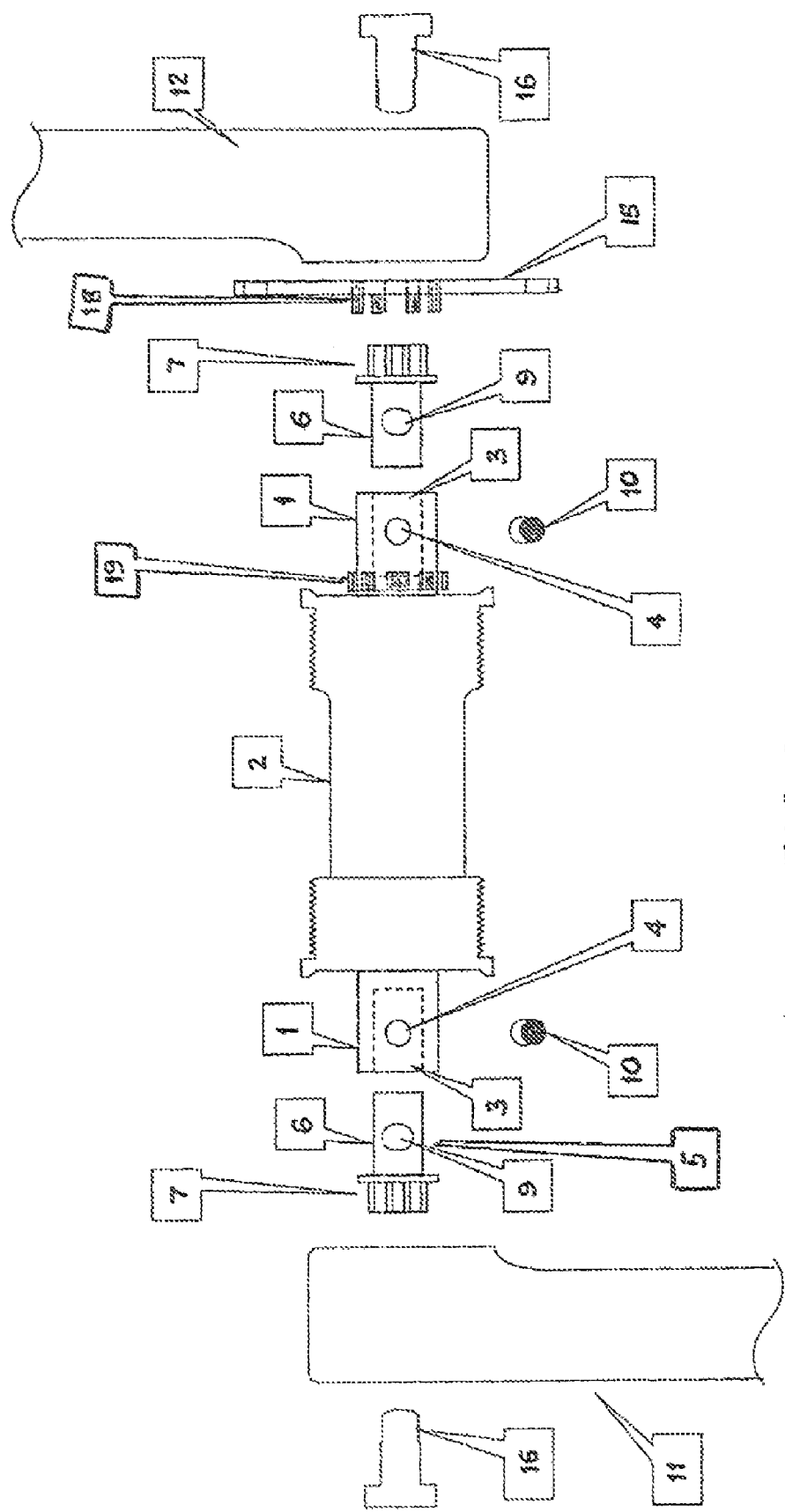
FIG. 2 is an exploded schematic view of a variant of the embodiment of FIG. 1.

In a variant of the embodiment of FIG. 1, as shown in FIG. 2, with like numerals representing the same components as in the embodiment of FIG. 1, the mounting flange or spider 15 is not formed or provided as an integral part of right crank member 12. Indeed in this arrangement the spider 15 includes a plurality of spaced-apart dogs or lugs 18, disposed around the periphery of a central aperture thereof. The right hand free end of the spindle 1 also includes, disposed around the periphery thereof, a plurality of spaced-apart dogs or lugs 19, of a size and shape substantially complementary to those of the spider 15. The arrangement is such that the respective sets of dogs or lugs 18,19 inter-react or co-operate, such that there is no relative movement between the spider 15 and spindle 1. In operation, the respective left and right side stub axles 5 are each located within an associated hollow section 3 of the spindle 1, a pin 10 is then inserted through each aperture or recess 4 of the spindle 1, extending into the aperture or recess 9 of the stub axle 5. The arrangement is such that each crank arm 11, 12 is then coupled to the spindle 1, with the right crank arm 12 having the spider 15 associated therewith, so as to allow for relative movement, to a limited extent, between the crank arm 12 and the spider 15.

Figure 3:
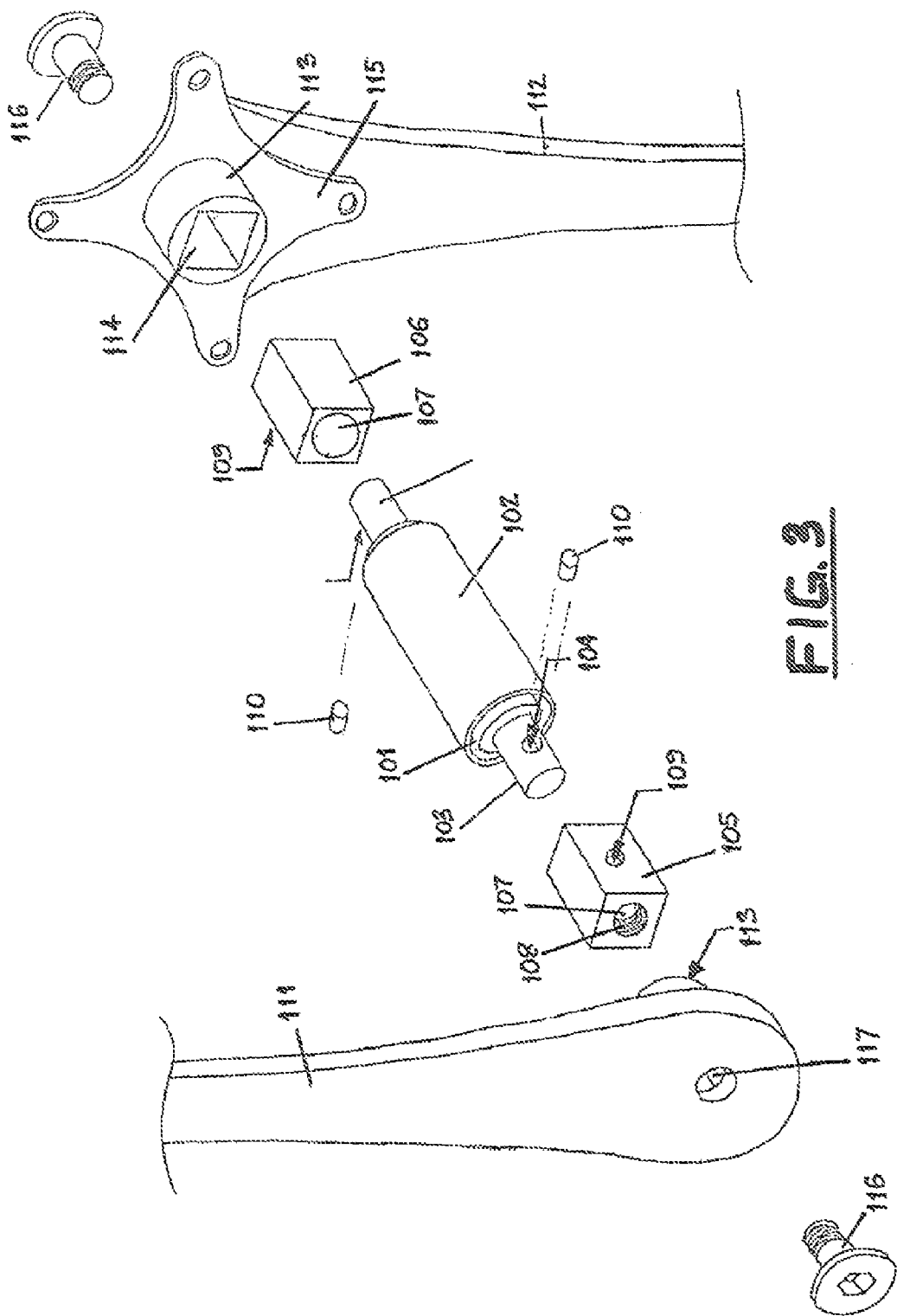
FIG. 3 is a view, similar to FIG. 1, of a further embodiment of the present invention.

Turning now to the embodiment of FIG. 3 the arrangement shown therein, in like manner to those of FIGS. 1 and 2, includes a crank spindle or shaft 101 which is disposed longitudinally or axially within a crank spindle housing 102 and protrudes from each end thereof (as shown). Here again, and as with the earlier embodiments, friction bearings of any known type (not shown) may be employed to support the spindle 101 within the housing 102 whereby to allow for smooth relative rotation therebetween.

In this embodiment the crank spindle 101 is in the form of a substantially solid cylindrical member having a section 103 of reduced diameter at each free end thereof. At a location displaced from each free end of the crank spindle 101, in the section of reduced diameter 103 thereof and extending radially thereinto, there is provided an aperture or recess 104 which, preferably, does not extend across the entire width or diameter of the end section 103 of reduced diameter.

In this embodiment there are provided respective left and right mounting blocks 105,106, each of which has a bore 107 extending therethrough in the axial direction thereof, and of a size and shape complementary to that of the associated free end 103 (of reduced diameter and located substantially centrally thereof) of spindle 101. That axial bore 107 is internally threaded as shown at 108. The mounting blocks 105,106 also each include an aperture or recess 109 extending substantially laterally or transversely thereof. The arrangement is such that the mounting blocks 105,106 are adapted to rotatably receive the associated end section of reduced diameter 103 of the crank spindle 101. A pin or the like member 110 is then adapted to be located within both the aperture or recess 109 of the mounting blocks 105,106 and to extend into the mating aperture or recess 104 provided in the associated spindle end section 103.

In accordance with this embodiment the aperture or recess 109 of the mounting blocks 105,106 is of the same dimension, in the direction of the longitudinal axis of both the mounting block and the crank spindle 101, as the corresponding dimension of both the aperture or recess 104 of the end section 103 of the crank spindle 101 and the pin or the like member 110, whereby to prevent any relative axial movement between the mounting blocks 105,106 and crank spindle 101. However, and in the circumferential direction, the aperture or recess 104 is of a slightly larger dimension than that of both the aperture or recess 109 of the mounting blocks 105,106 and the pin or the like member 110. In such a way, whilst longitudinal or axial movement between mounting blocks 105,106 and the crank spindle 101 will not be possible, a limited degree of relative radial movement will be possible there-between. The difference in circumferential extent of the aperture or recess 104, as compared with that of the aperture or recess 109, may be varied in accordance with the invention. In an especially preferred embodiment the different dimensions will allow for a maximum of two degrees of relative rotational movement between the mounting blocks 105,106 and the crank spindle 101.

In the drawing there are shown respective left and right crank members 111,112 to each of which can be mounted, in any known manner and using any known means, a pedal or the like driving means (not shown). The crank members 111,112 each include a sleeve 113, preferably formed integrally therewith. The sleeve 113 has a bore 114 extending axially thereof, of a size and shape complementary to that of the associated mounting block 105 or 106. The arrangement is such that, in use, the mounting blocks 105,106 are received and retained within the bore 114 of the associated crank members 111,112, with the free ends 103 of the spindle 101 in turn located within the axial bore 107 of the associated mounting block 105 or 106. In the preferred embodiment illustrated the right crank member 112 will include a mounting spider or flange 115, onto which chain rings and/or drive mechanism (not shown) may be mounted in accordance with known practices. A threaded bolt or the like member 116 may be provided to allow for securing together of the various components making up the overall assembly. In similar manner to the embodiments of FIGS. 1 and 2 that bolt member 116 will extend through an aperture 117 provided in each crank member 111, 112 into the sleeve 113 thereof and then into engagement with the threaded section 108 of the bore 107 of the associated mounting block 105 or 106.

In use the crank spindle 101 and associated housing 102 are mounted in a frame of or for a bicycle. The aforementioned friction bearings (not shown) allow the spindle 101 to freely rotate relative to the housing 102 whilst bearing loads/forces applied to it by the cyclist through the crank members 111, 112. The arrangement is such that, when the pin member 110 is inserted through the aperture or recess 109 of the relevant mounting block 105 or 106, and then into the aperture or recess 104 of the end section 103 of the spindle 101, then whilst the mounting blocks 105,106 will each be allowed a pre-determined degree of angular rotation relative to the spindle 101, they will be prevented from moving axially relative to said spindle 101. In an especially preferred embodiment the pin member 110 will be manufactured (sized) such that, when fully inserted into the apertures or recesses 109 and 104, the surface of the outer end thereof lies substantially flush with the outer surface of the associated mounting block 105,106.

With the left and right mounting blocks 105,106 each receiving a respective end 103 of the crank spindle 101, and pin 110 inserted through aperture or recess 109 of the associated mounting block into the aperture or recess 104 of the associated free end section 103 of the spindle 101, crank members 111,112 may be married up to this assembly, so that the crank members 111,112 are at substantially 180 degrees to one another.

Figure 4:
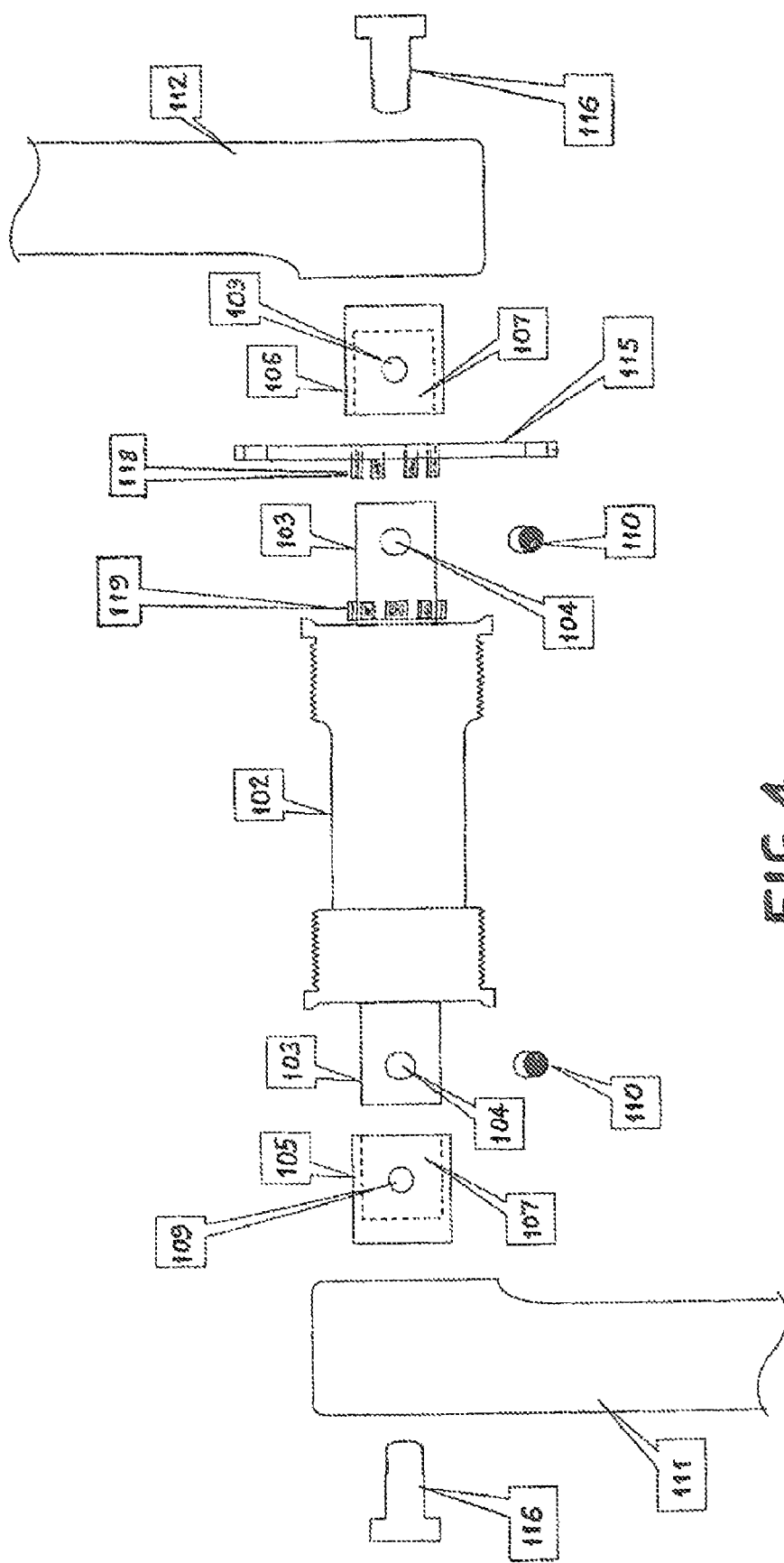
FIG. 4 is an exploded schematic view of a variant of the embodiment of FIG. 3.

Turning now to the embodiment of FIG. 4, in contrast to the embodiment of FIG. 3 the mounting flange or spider 115 therein is not formed or provided as an integral part of right crank member 112. Rather, in this arrangement the spider 115 is a separate component, adapted in use to be disposed around the free end section 103 of crank spindle 101 and to be removably mountable in relation to the crank member 112. The spider 115 includes a plurality of spaced-apart dogs or lugs 118, disposed around the periphery of a centrally disposed aperture thereof. In this embodiment the right hand such free end 103 of the spindle 101 includes, disposed around at least part of the periphery thereof, a plurality of spaced-apart dogs or lugs 119, of a size and shape substantially complementary to those dogs or lugs 118 of the spider 115. As with the embodiment of FIG. 2, the respective sets of dogs or lugs 118,119 inter-react or co-operate, such that there is no relative movement between the spider 115 and spindle 101. In like manner to the embodiment of FIG. 3, the left and right side mounting blocks 105, 106 are each disposed about the associated end 103 of the spindle 101, and a pin 110 is inserted through each aperture or recess 109 of the mounting blocks 105, 106 and extending into the associated aperture or recess 104 of the ends 103 of the spindle 101. The arrangement is such that each crank arm 111, 112 is then coupled to the spindle 101 so as to allow for relative movement to a limited extent, between the crank arm 112 and the spider 115.

Figure 5:
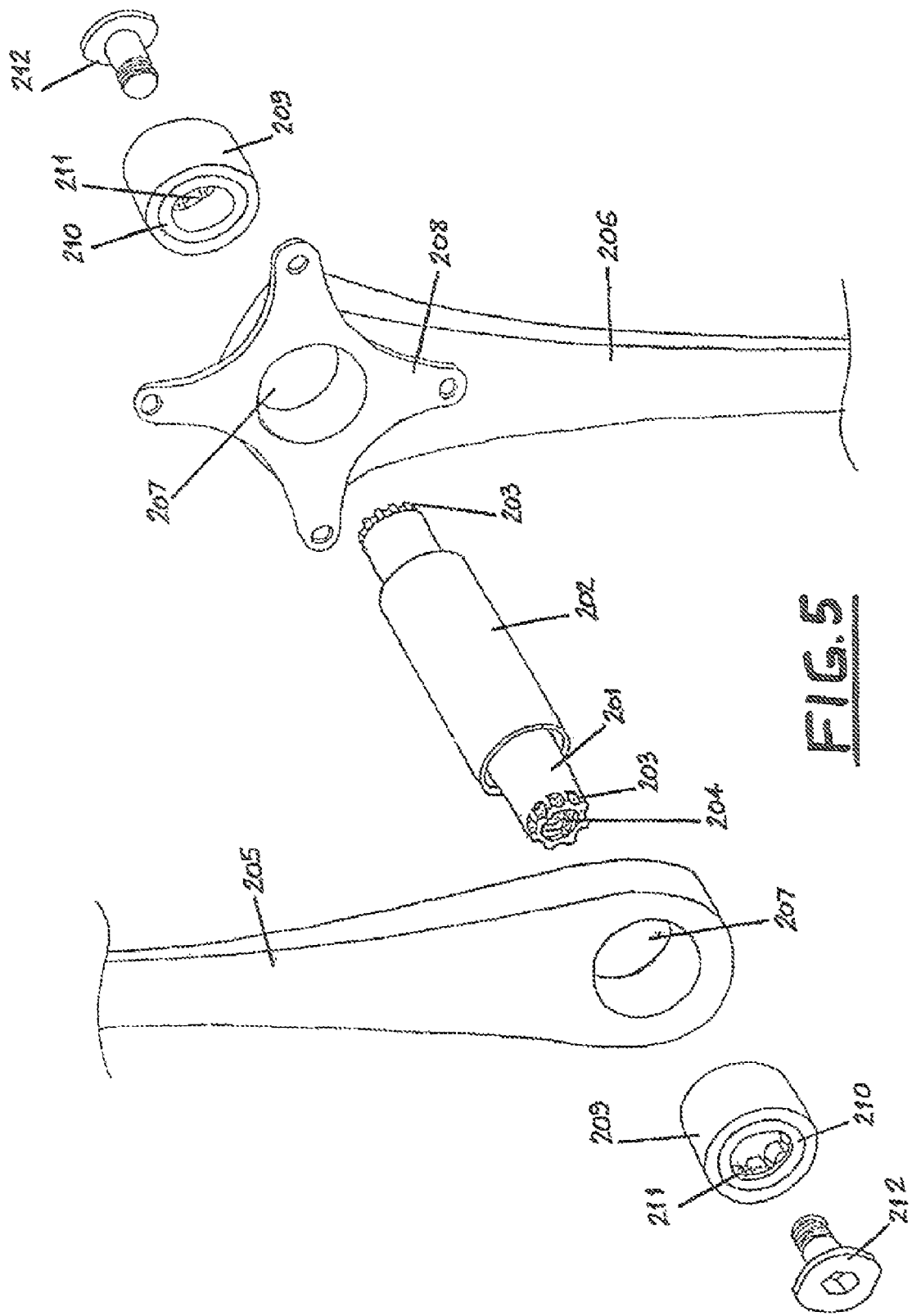
FIG. 5 is a view, similar to FIG. 1, of yet another embodiment of the present invention

With reference now to the embodiment of FIG. 5, the arrangement shown therein includes a crank spindle 201 which is disposed within a crank spindle housing 202 and protrudes from each end thereof (as shown). As with the previous embodiments low friction bearings of any known type (not shown) are employed to support the spindle 201 within the housing 202 and to allow for smooth relative rotation therebetween.

In this embodiment the crank spindle 201 is in the form of a substantially cylindrical member having a splined portion 203 formed at or in the vicinity of each free end thereof. Each end of the spindle 201 has a threaded bore 204 therein and extending axially thereinto.

In the drawing there are shown respective left and right crank members 205,206 to each of which can be mounted, in any known manner and using any known means, a pedal (not shown). The crank members 205,206 each include an aperture or opening 207 extending therethrough. In the preferred embodiment illustrated the right crank member 206 will include a mounting flange or spider 208, onto which chain rings and/or a drive mechanism (not shown) may be mounted in accordance with known practices.

In accordance with this embodiment bearing means are provided, the bearing means being comprised of two parts, namely outer casing 209 and inner casing 210, constructed so that the outer casing 209 is able to rotate about the inner casing 210 by the required degree of angular rotation. However, respective inner and outer casings 210,209 have no radial or axial movement relative to one another. The inner casing 210 is internally splined, as at 211.

A bolt or the like fixing member 212, preferably threaded as shown, is provided at each side of the overall mechanisms, whereby to interconnect the respective crank members 205, 206 and the associated bearing mechanism with spindle 201, by engagement of the threaded end of the bolt 212 within the associated threaded end portion 204 of the spindle 201. Preferably the inner casing 210 and the spindle 201 are of substantially the same diameter, whereby to prevent unwanted translation or angular movement.

When installed the outer casing 209 is in a press-type fit with an aperture or opening 207 of the respective crank members 205,206, to prevent any movement (such as rotation, translation or angulation) between outer casing 209 and crank members 205,206. The sleeve of inner casing 210 is connected with crank spindle 201, by means of the respective splined sections 203,211, to restrict movement between them.

With the bearing means pressed into crank members 205, 206, each crank assembly is mated with crank spindle 201 so that the crank members 205,206 are at substantially 180 degrees to one another. The splines 211 of inner casing 210 engage with splines 203 of crank spindle 201.

Figure 6:
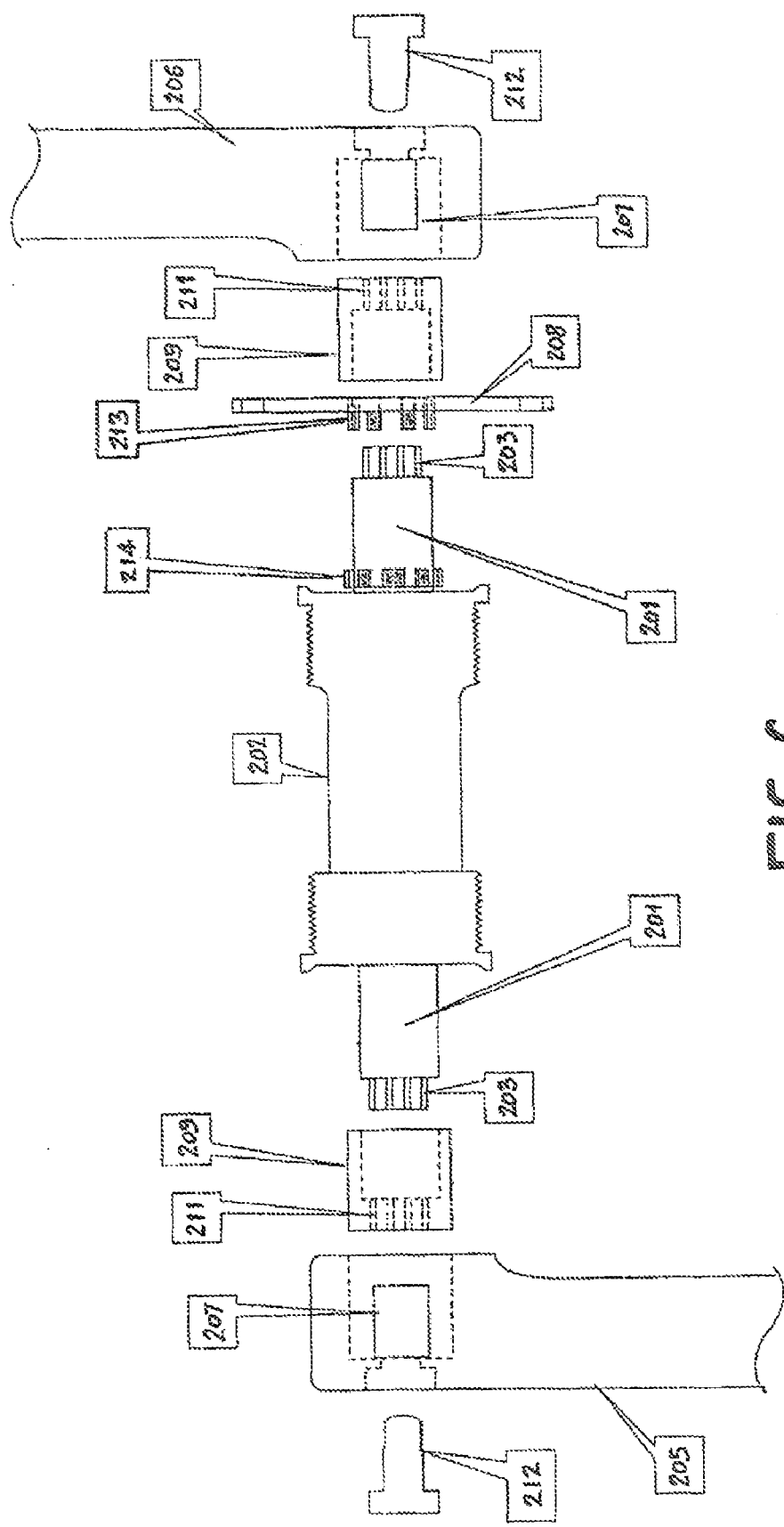
FIG. 6 is an exploded schematic view of a variant of the embodiment of FIG. 5.

In like manner to the embodiments of FIGS. 2 and 4, and in contrast to the embodiment of FIG. 5, with the embodiment of FIG. 6 the mounting flange or spider 208 thereon is not formed or provided as an integral part of right crank member 206. Rather, in this arrangement the spider 208 is a separate component, adapted in use to be disposed around the crank spindle 201 and to be removably mountable in relation to the crank member 206. The spider 208 includes a plurality of spaced-apart dogs or lugs 213, disposed around the periphery of a centrally disposed aperture thereof. In this embodiment the spindle 201 includes, disposed around at least part of the periphery thereof, a plurality of spaced-apart dogs or lugs 214, of a size and shape substantially complementary to those dogs or lugs 213 of the spider 208. As with the embodiments of FIGS. 2 and 4, the sets of dogs or lugs 213,214 inter-react or co-operate, such that there is no relative movement between the spider 208 and the spindle 201. In operation, the spider 208 is attached to the spindle 201 due to interaction between the sets of dogs or lugs 214, 213. The bearing means are then press-fitted into the crank arms 205, 206. Thereafter the crank arms 205, 206 are each coupled to the spindle for relative movement, to a limited extent, between crank arms 206 and spider 208.

Figure 7:
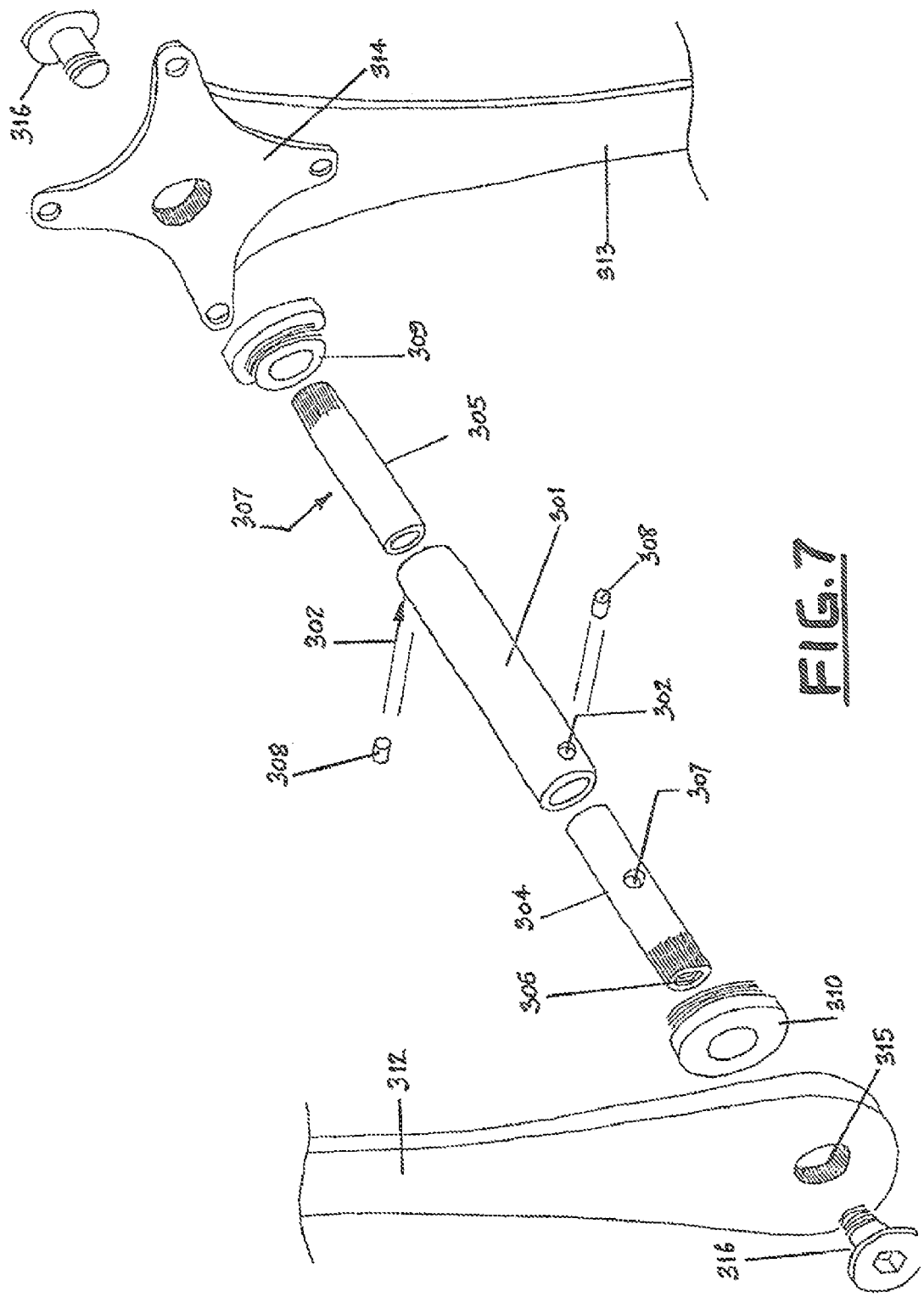
FIG. 7 is a view, similar to FIG. 1, of yet a further embodiment of the invention.

Turning now to the embodiment of FIG. 7 the arrangement shown therein includes, as a first component, a shaft member which, preferably, is in the form of an elongate, hollow tubular element 301, substantially circular in cross-section, having apertures 302 displaced from each free end thereof and extending radially thereof into a central aperture or bore 303 thereof. There are also included respective left and right axle members 304,305, each adapted in use to be disposed within the central aperture 303 of an associated free end of the shaft member 301. In an especially preferred embodiment low friction bearings or surfaces of any known type (not shown) are disposed between left and right axle members 304,305, and shaft 301, and to allow for smooth relative rotation therebetween.

In this embodiment the axle members 304,305 are each in the form of a substantially cylindrical member having a threaded bore 306 formed in at least one end thereof. Displaced from each end of each axle member 304,305, and preferably substantially mid-way along the length thereof and extending radially thereinto, is an aperture or recess 307, machined or in any other suitable manner formed therein.

In use, the right and left axle members 305,304 are each adapted to be located within a respective end bore 303 of the hollow shaft 301, the arrangement being such that there can be no translation or angular movement between the components. When pin 308 is inserted through the associated aperture or recess 302 of shaft 301, into the aperture or recess 307 of the associated axle member 304,305, then whilst the axle members 304,305 will be allowed a predetermined degree of angular rotation relative to the housing 301, they will be prevented from moving axially relative thereto.

In like manner to the earlier-described embodiments this result will be achieved by having the aperture or recess 307 of each axle member 304,305 of the same dimension as that of the aperture or recess 302 of housing 301 and pin 308 in the direction of the longitudinal axis thereof, but of a slightly different dimension in the circumferential direction. Again as with the earlier to embodiments the difference in circumferential direction or extent between the apertures or recesses 307, 302 may be varied.

With right and left axle members 305,304 inserted into respective ends of hollow housing 301 so that apertures or recess 302 are aligned with a respective aperture or recess 307, and pin 308 inserted through aperture or recess 302 into recess or aperture 307, then right and left adaptors 309,310 fit over hollow shaft 301 to rotatably mount the assembly in the bicycle frame. The adaptors 309,310 are preferably a bearing mechanism in the form of an outer and inner shell, the inner shell being externally threaded as at 311 to secure the adaptor to a bicycle frame, with the inner shell having an aperture of substantially the same dimensions as the outer diameter of shaft 301 and providing rotatable support for shaft 301.

In like manner to the earlier embodiments the embodiment of FIG. 7 includes respective left and right crank members 312,313, with the right member 313 having a mounting flange or spider 314 associated therewith (in any known manner). The spider 314 may have mounted thereto, in any known manner and using any known means, chain rings and/or a drive mechanism. Each crank member 312,313 has associated therewith a pedal or the like (not shown). At or in the vicinity of that end of each crank member 312,313, there will be formed an aperture 315 extending therethrough. A bolt or the like threaded member 316 is adapted, in use, to be disposed through the aperture 315 of a crank member 312,313 into the threaded bore 306 of the associated axle member 304,305.

Figure 8:
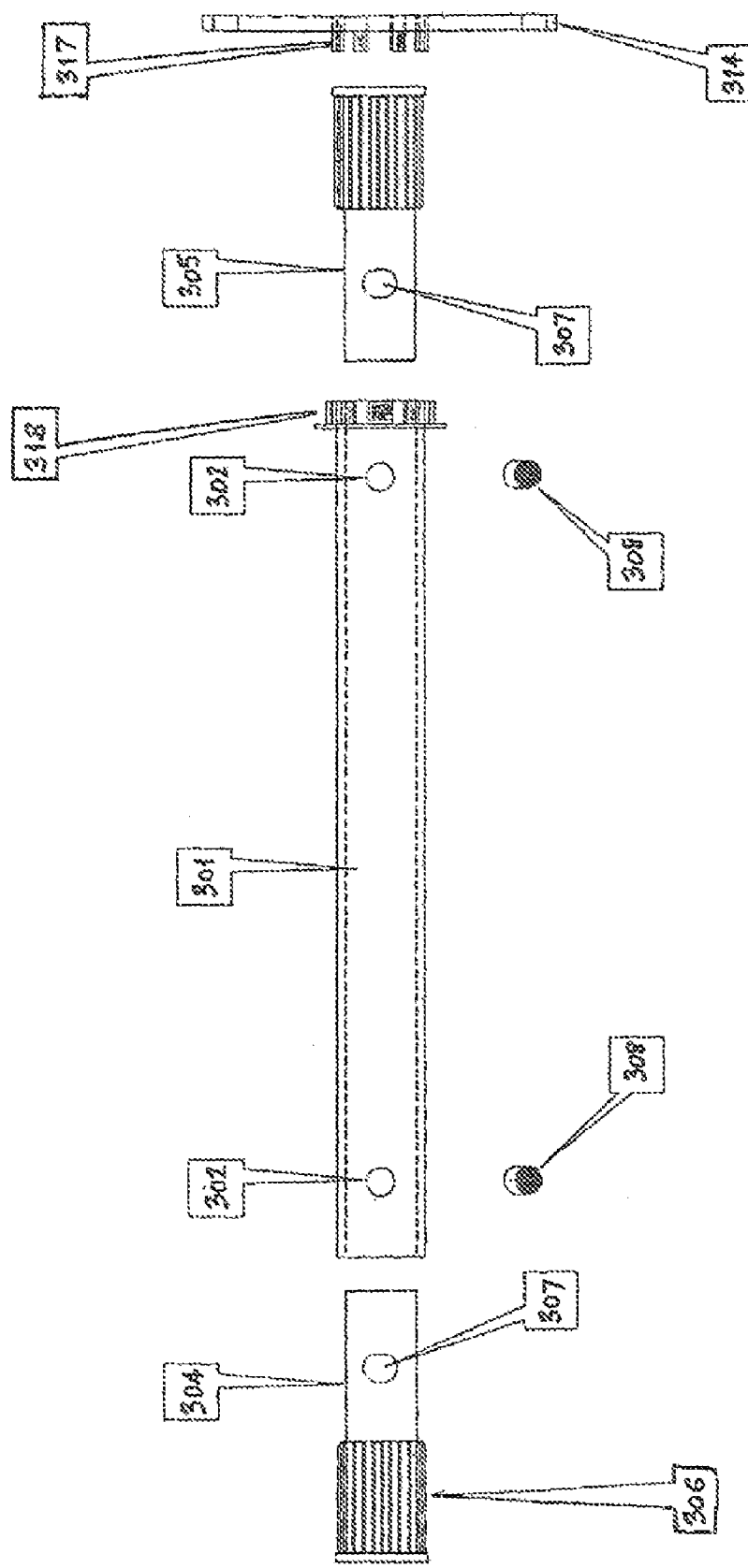
FIG. 8 is an exploded schematic view of a variant of the embodiment of FIG. 7

Turning now to the embodiment of FIG. 8, in contrast to the embodiment of FIG. 7 the mounting flange or spider 314 thereon is not formed and provided as an integral part of right crank member 313. Rather, in this arrangement the spider 314 is a separate component, adapted in use to be disposed around the shaft 301 and to be removably mountable in relation to the crank member 313. The spider 314 includes a plurality of spaced-apart dogs or lugs 317, disposed around the periphery of centrally disposed aperture thereof. In this embodiment the spindle or hollow shaft 301 includes, disposed around at least part of the periphery thereof, a plurality of spaced-apart dogs or lugs 318 of a size and shape substantially complementary to those dogs or lugs 317 of the spider 314. As with the embodiments of FIGS. 2, 4 and 6, the sets of dogs or lugs 317,318 inter-react or co-operate; such that there is no relative movement between the spider 314 and spindle 301. In operation the axle member 304, 305 are each coupled to the spindle 301, and the spider 314 is then associated with the spindle 301, through inter-action of the respective sets of dogs or lugs 317, 318. Pins 308 are then disposed through apertures 302 of spindle 301, extending into aperture 307 of axle members 304, 305. The spindle 301 can then be mounted on adaptor members 310, 309, and the crank arms 312, 313 then attached to the free ends of axle members 304, 305. The crank arm 313 may be coupled to the spindle 301 so as to allow for relative movement, to a limited extent, between crank arm 313 and spider 314.

The arrangements in accordance with the invention all act to accentuate any dead points in the application of torque to the crank members of a bicycle, and therefore alert the cyclist to the fact that energy is being wasted. The cyclist can then respond to prevent further energy losses by ensuring that the leg applies torque which contributes only to the forward motion of the bicycle. The cyclist's pedalling performance is improved by being more efficient and developing leg muscles through continual training to pedal in a circular motion. The bicycle will go faster as a result.

Whilst in the embodiments of FIGS. 1, 2, 3, 4, 7 and 8 there are illustrated arrangements wherein crank spindle 1 and stub axles 5 (FIG. 1), crank spindle end section 103 and mounting blocks 105, 106 (FIG. 2) and hollow tubular element 301 and axle members 304,305 (FIG. 4) have only one aperture or recess, in alternative embodiments (not shown) a plurality of recesses or apertures may be provided in each of crank spindle 1 and/or stub axle 4, crank spindle end section 103 and/or mounting blocks 105,106 and hollow element 301 and/or axle members 304,305.

In yet a further embodiment, again not shown, the spindle 1 (FIGS. 1 and 2), spindle end section 103 (FIGS. 3 and 4), spindle 201 (FIGS. 5 and 6) and/or axle members 304,305 (FIGS. 7 and 8) may be in the form of substantially hollow tubular elements.

In accordance with alternative arrangements, for each of the embodiments of FIGS. 1 to 8 wherein the spiders 15, 115, 208 and 314 are an integral part of the associated crank arm or member 12, 112, 206 and 313, the spiders may be separate from the associated crank arms or members. In those alternative embodiments separate and particularly configured adaptor means may be provided, to be associated with said spindle and/or said spider, to assist in achieving the desired working relationship therebetween. In each instance a flange or the like circumferential extension may be provided at a predetermined distance from the right side free end of the spindle 1, 101, 201 and 301, such flange acting as a seating for a spindle adaptor to be disposed thereon. The spindle adaptor will be of a configuration to allow for co-operation with the free end of the associated spindle, whether such as spindles 1, 101, 201 and 301, or for that matter any other spindle currently available and in use, as for example Shimano Octalink, ISIS drive, whether square tapered, splined, etc. Such a spindle adaptor allows an arrangement in accordance with the present invention to be retro-fitted to an existing bicycle.

Figure 9:
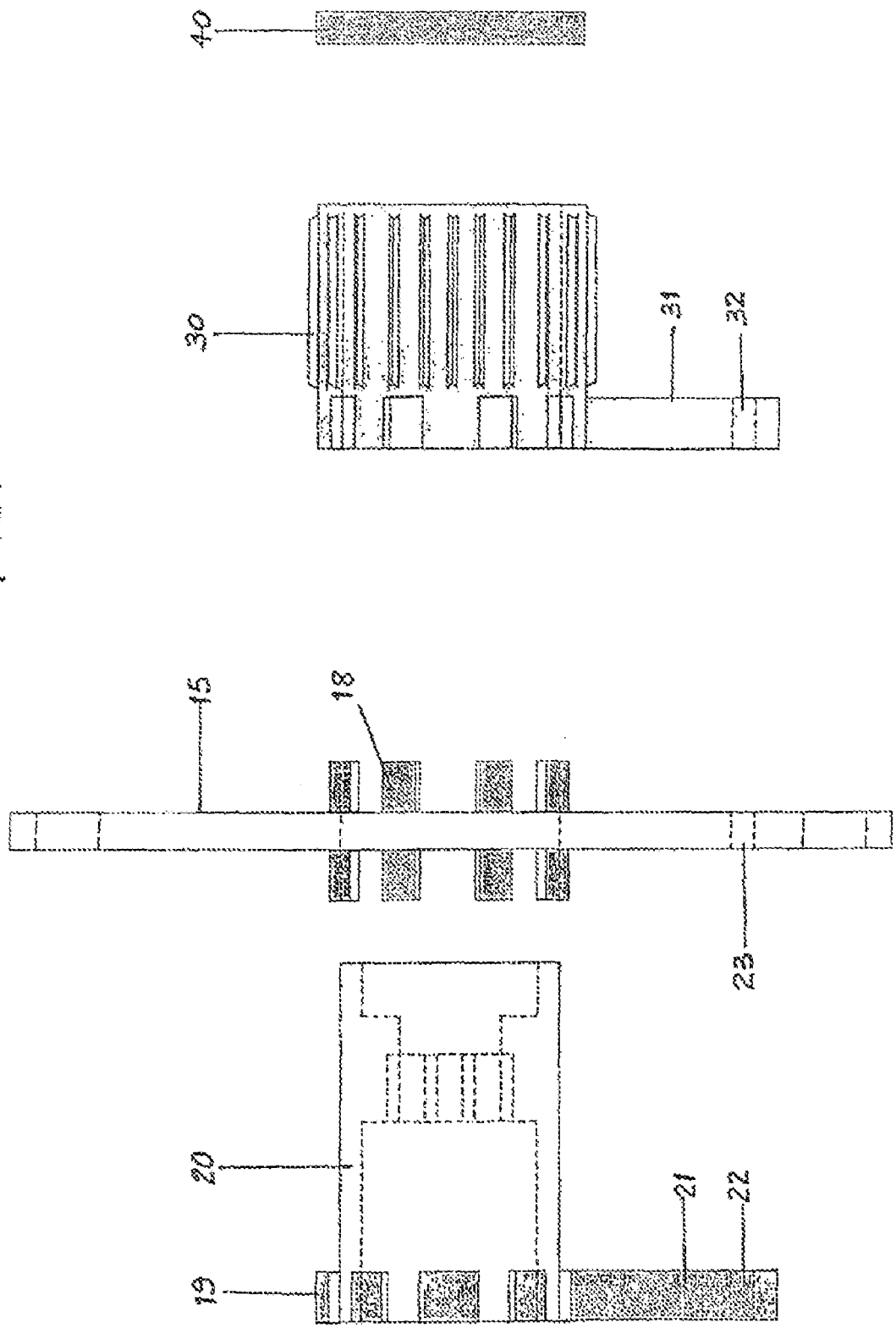
FIG. 9 is a schematic view of means in accordance with the invention which allows for retro-fitting of an application in accordance with the present invention to an existing bicycle.
Figure 10:
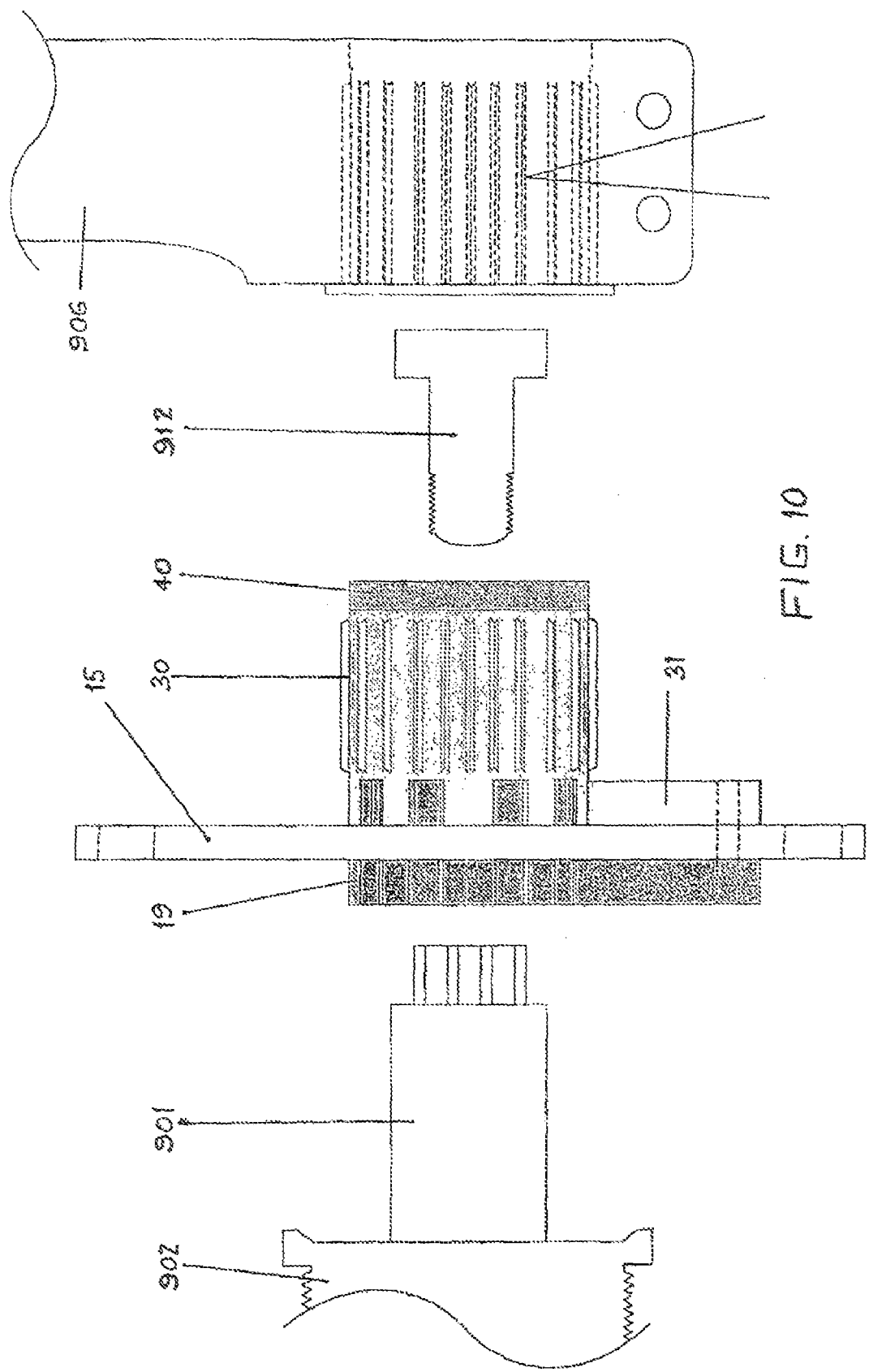
FIG. 10 is a view of the arrangement of FIG. 9, for installation relative to a crank arm of a given bicycle.

Turning now to FIGS. 9 and 10, there is shown therein yet another variant of the present time, this being specifically intended to be capable of being retro-fitted to an existing bicycle, as for example a bicycle which utilizes a "conventional" bottom bracket spindle, as shown as 901 adapted to be located within a housing 902 as shown. In that regard, and with this embodiment, the reference numerals 901, 902, 906, 912 as appearing on the drawings are the equivalent of components 201, 202, 206 and 212, for example, of the embodiment of FIG. 6. The other numerals appearing on the drawings also have equivalents in the earlier embodiments. With this embodiment adaptor means, generally designated 20 and 30, will assist in adaptation of the "conventional" components.

A spindle adaptor 20 will be in the form of a substantially elongate, hollow member having a set of dogs or lugs 19 disposed around the periphery thereof as shown. In the especially preferred embodiment illustrated that adaptor 20 will include an extension 21 formed thereon, such extension 21 including an aperture 22 formed in the vicinity of the free end thereof. The spider 15 for use in this variant will include a complementary aperture 23 as shown. The adaptor 20 has an internal configuration as shown in phantom in FIG. 9, the arrangement being such as to be received, and releasably retained by complementary splined end of spindle 901 as shown in FIG. 10.

This particular embodiment further includes a crank adaptor 30, having a splined or knurled outer surface as shown. The splines, knurling (or other equivalent means) will allow the crank adaptor to securely engage with the crank arm 906 as shown in FIG. 10. The crank adaptor 30 includes an internal bearing surface which is adapted, in use, to co-operate or fit with the external surface of the spindle adaptor 20. Such adaptor 30 can, in like manner to adaptor 20, preferably have an extension 31 having an aperture 32 formed therein. The adaptor 30 is, in use, disposed within a complementary aperture extending through crank arm 906.

The adaptor 30 is also intended, in use, to be in contact with the spider 15. In that regard, in this preferred embodiment the spider 15 will include opposed sets of dogs or lugs 18. Once set of these dogs or lugs 18 are, in use, in engagement with the spindle adaptor 20, allowing restricted angular rotation/movement thereto. The other set of dogs 18 are in like manner in engagement with the crank adaptor 30, in turn allowing for restricted angular rotation/movement relative to that adaptor 30. The spider 15 will also, in accordance with known practices, include one or more further apertures to allow for affixture thereto of chain rings or other power take-off means.

In the especially preferred embodiment illustrated an annular fixing means 40 is also provided, such to be securely affixed to the spindle adaptor such as to allow for rotation of crank adaptor 30, spider 15 and spindle adaptor 20 relative to one another.

FIG. 10 shows the arrangement as described in the previous paragraphs ready to be coupled to the right side crank arm 906.

The arrangement is such that a pin or the like member (not shown) may be disposed within apertures 22, 23 and 32, to prevent angular relative rotation of the crank adaptor 30, spider 15 and spindle adaptor 20 as and if desired.

In accordance with yet another alternative (not shown) the spindle itself may include an aperture or blind bore extending across at least part of the cross-section thereof and located in the vicinity of the flange and associated lugs. Both the crank adaptor and the lugs on the spider will then include an aperture of a similar dimension to that of the spindle. The arrangement is such that a locking pin/elongate member will be adapted in use, to be located within mating apertures of the crank adaptor, spider and spindle to prevent relative movement therebetween.

Figure 11:
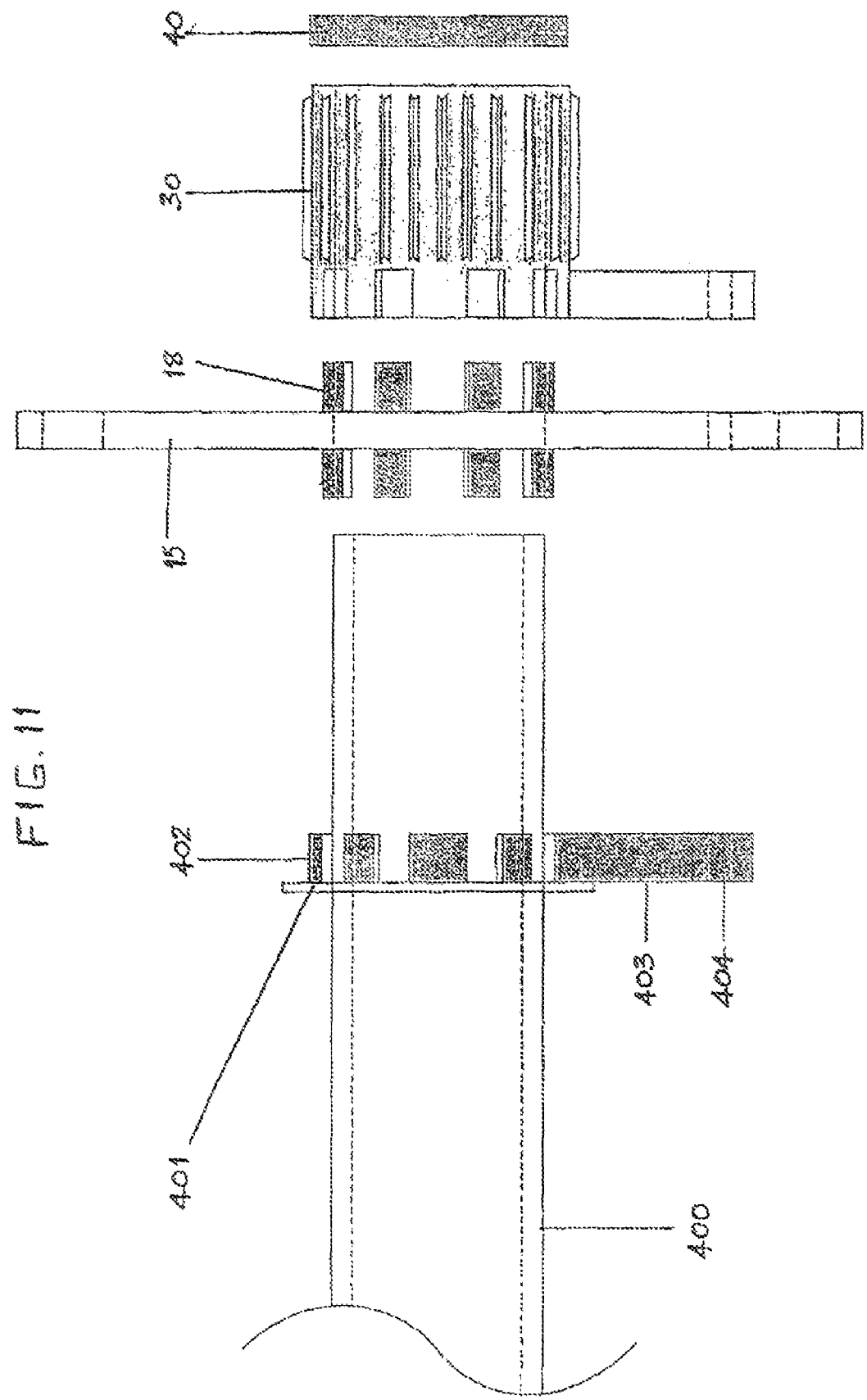
FIG. 11 is an exploded schematic view of a variant of the embodiment of FIGS. 9 and 10.

In FIG. 11 there is shown another possible variant, wherein a spindle 400 includes a flange 401 and a set of dogs or lugs 402 associated therewith, and having an extension 403 extruding normally to the spindle 400, such extrusion having an aperture 404 in the vicinity of the free end thereof. With this arrangement, no spindle adaptor need be employed, but a crank adaptor 30 of the type referred to earlier, in conjunction with an annular fixing means 40, may again be employed.

Figure 12:
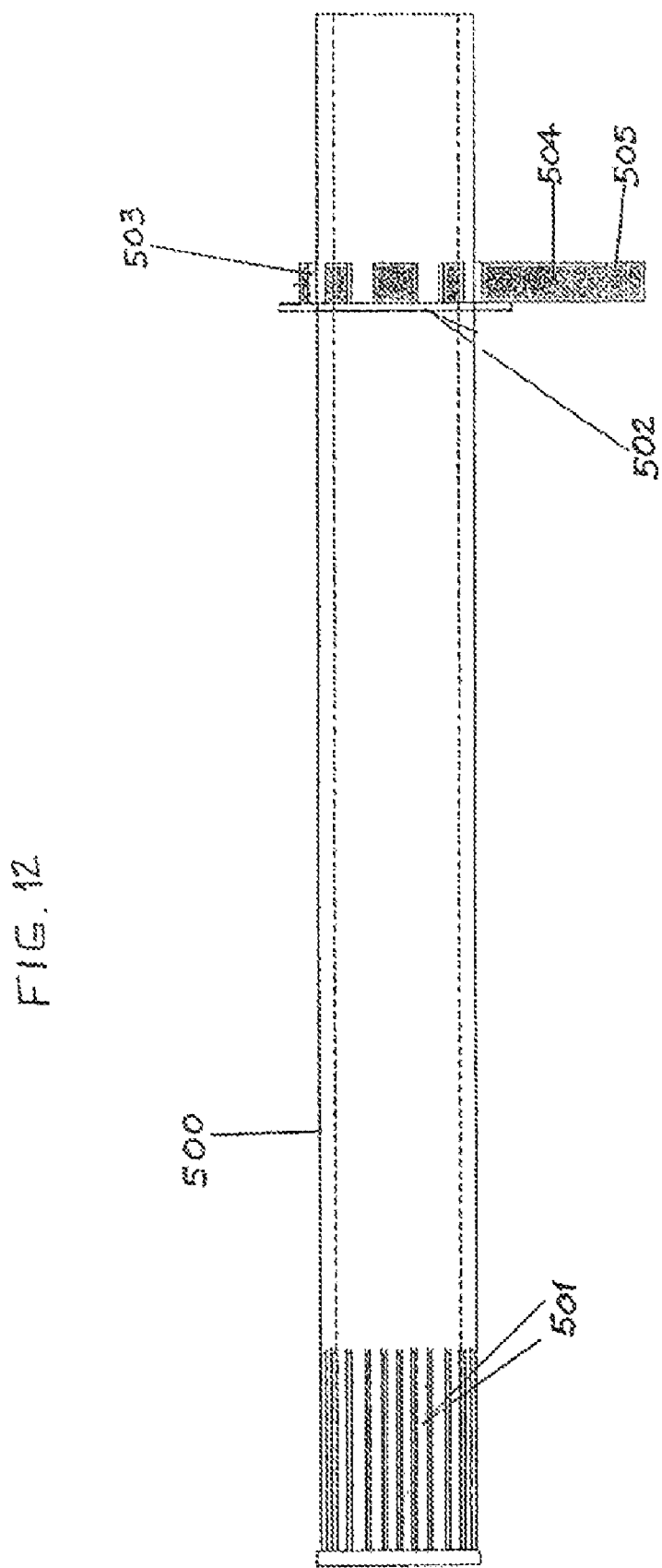
FIG. 12 is a side view of an improved spindle for use in arrangements in accordance with the embodiments of FIGS. 9 to 11 in particular.

In yet a further alternative, as shown in FIG. 12, a further type of spindle 500 may be employed. Such spindle 500 may be in the form of an elongate member having splines (or any other suitable means) at one free end thereof, such to allow for engagement with a crank arm of a bicycle. Spaced from the opposed free end of the spindle 500 is a flange 502, having a set of dogs or lugs 503 associated therewith and extending around at least part of the periphery of said spindle 500. The flange 502 will act as a seating. As with FIGS. 9, 10, 11, an extension 504 may be provided having an aperture 505 extending therethrough.

This alternative embodiment may also include a crank adaptor 30 and annular fixing means 40, as in the embodiment of FIGS. 9, 10 and 11. In this embodiment the spider 15 will have internal slots corresponding to dogs or lugs 503 and a set of dogs or lugs extending relatively rearwardly thereof. The arrangement is such that the respective dogs or lugs and slots allow for interconnection of spindle 500, spider 15 and crank adaptor 30, for association with an appropriate crank arm.

Figure 13:
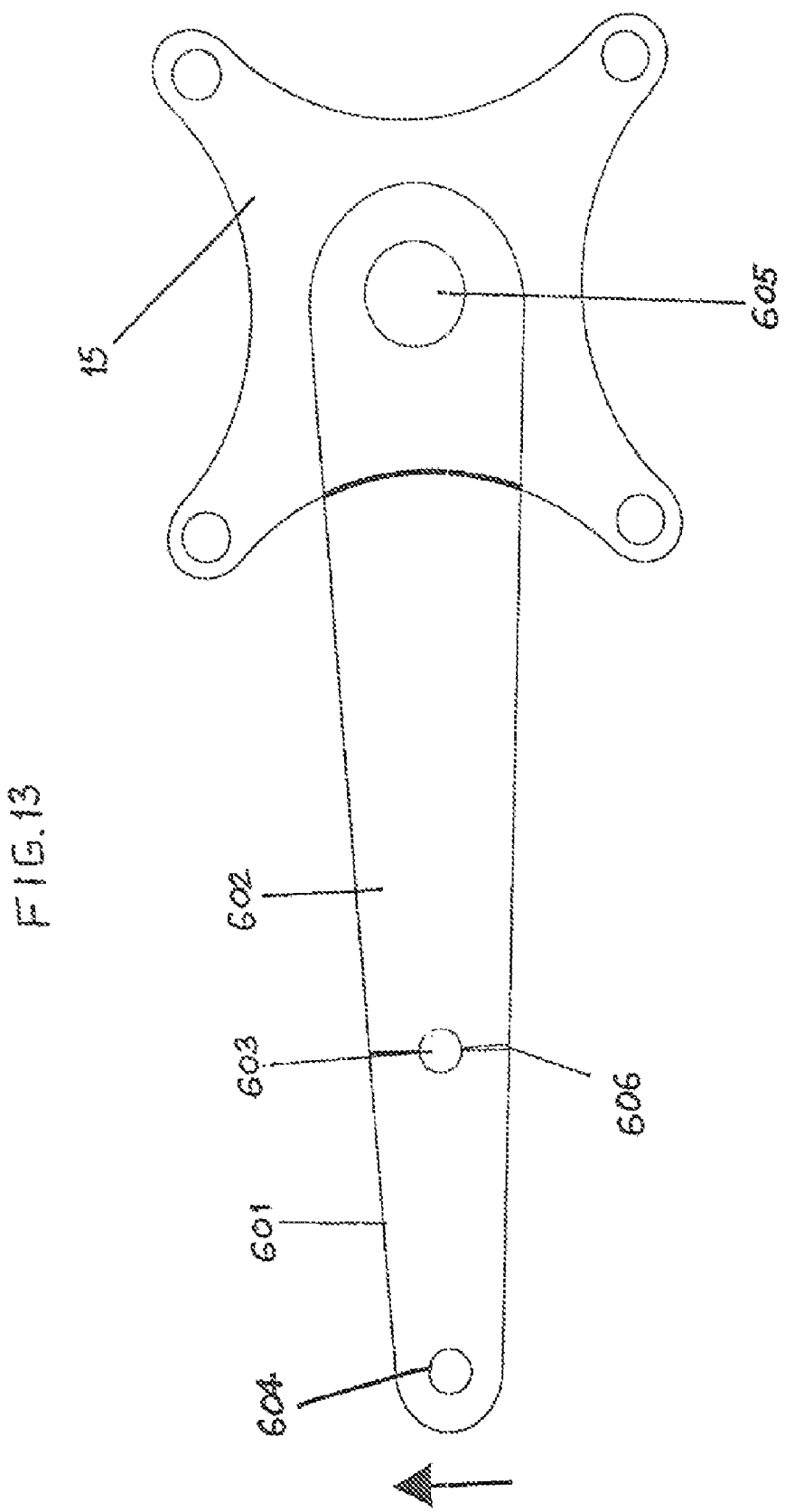
FIGS. 13 and 14 are views of a hinged crank arm I accordance with the invention.
Figure 14:
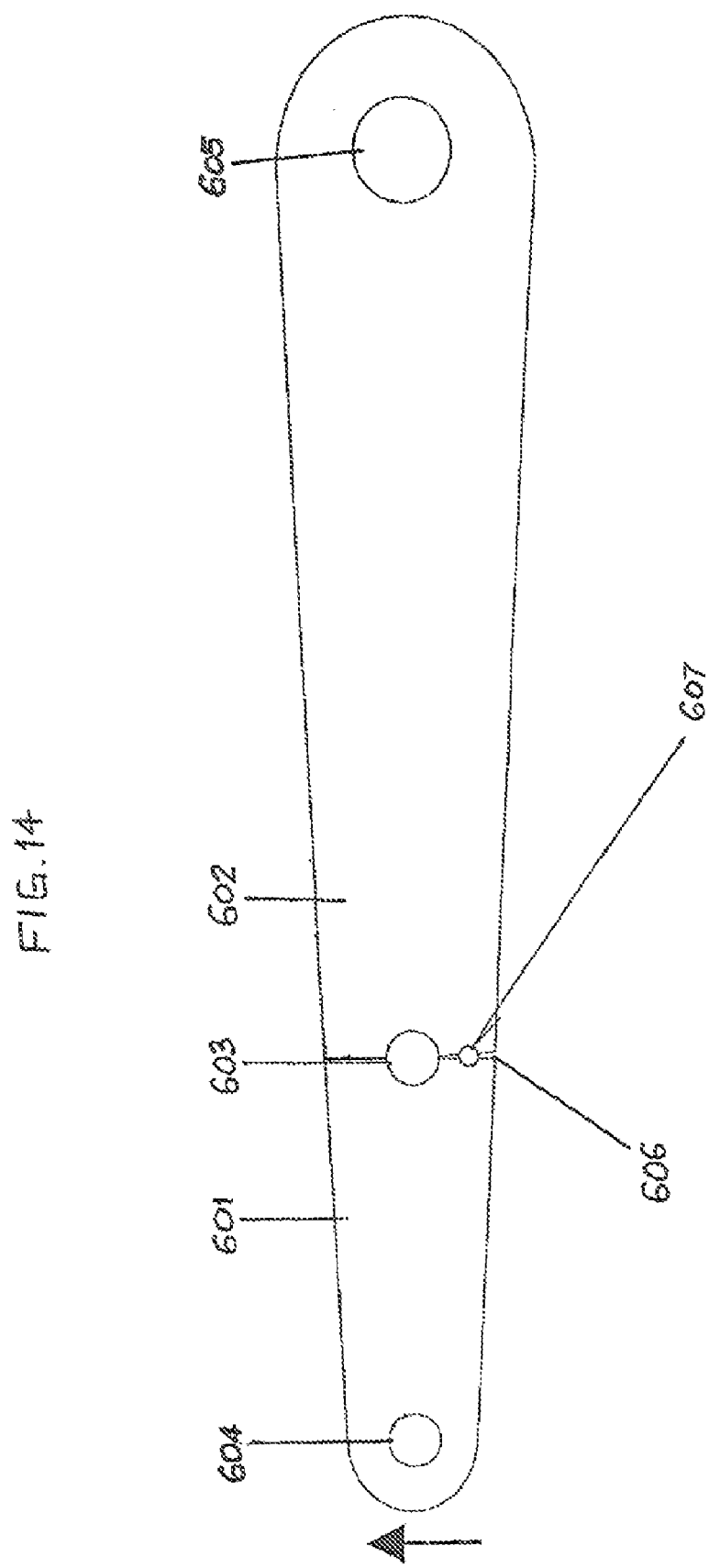
Figure 15:
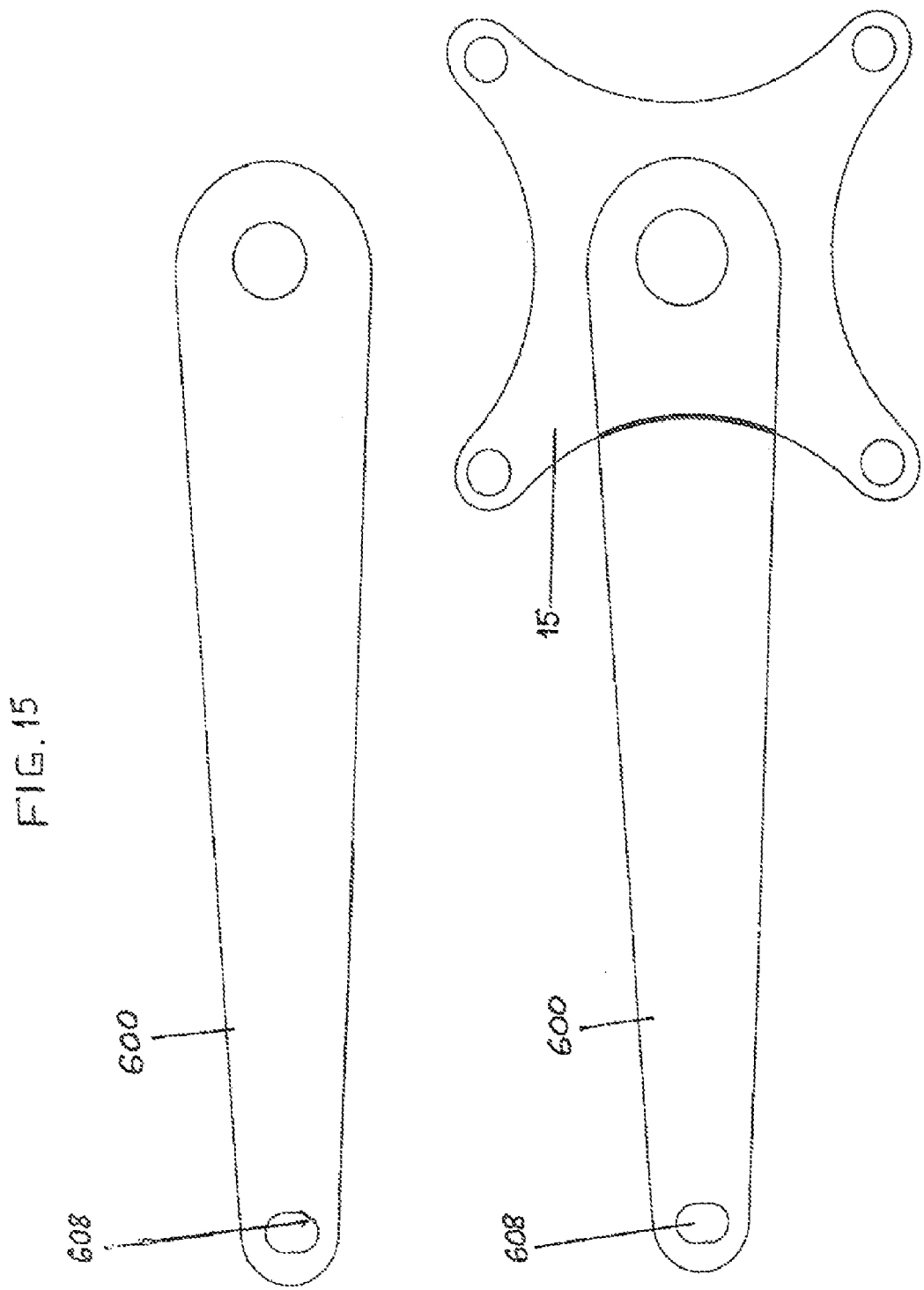
FIG. 15 is a view of an alternative form of crank arm in accordance with the invention.

With reference to FIGS. 13 to 15 inclusive, in accordance with another preferred embodiment of the invention the crank arm shown therein, rather than being of a unitary construction, includes two discrete sections 601 and 602 which are adapted, in use, to be interconnected in such a way as to allow for a limited degree of relative angular movement therebetween. In the especially preferred embodiment illustrated the sections 601 and 602 are interconnected, as by a pivot pin 603. The section 601 includes, at or in the vicinity of the free end thereof, an aperture 604 which is adapted to receive, and releasably retain therein and relative thereto, a pedal or the like (not shown). The other section 602 is adapted to be interconnected with a spider 15 (or the like) via an aperture 605 adapted to receive, and releasably retain, a fixing member (not shown) associated with said spider. The arrangement is such that there is possible only a limited extent of relative angular movement between the sections 601, 602 of the crank arm. To achieve that end at least one of the mating surfaces of each of sections 601 and 602 is not flat across tire entire width of the crank arm itself. This results, as shown in FIGS. 13 and 14, in there being a gap 606, or degree of angular separation, at one side of the crank arm between the opposed end surfaces of sections 601, 602. In the instance, for example, of torque being applied against the direction of pedalling, for example in the direction as shown by the arrow in FIG. 13 then this will cause the hinged crank-arm to open, whereby to allow for limited or restricted rotation thereof relative to an associated spider 15. On the other hand, if torque is being applied in the direction of pedalling, then the hinge will close, preventing any relative movement between the crank arm and the associated spider 15.

To allow the rider/user to utilize the mechanism normally, means may also be provided for locking up of the crank arm, thereby to prevent any relative angular movement between, or separation of, sections 601 and 602. In an especially preferred embodiment, as shown in FIG. 14, either or both crank arm sections 601, 602 may include a slot or cut-out section 607 in either or both of the two sections thereof, for releasably receiving a pin or the like member (not shown), whereby to prevent any relative movement between said hinged sections 601, 602.

In yet a further embodiment, a strain gauge or the like means may be located within a hinged crank arm of the type shown in FIGS. 13 and 14, to allow for measurement of the torque actually being applied to such crank arm.

In accordance with a further preferred embodiment, and as shown in FIG. 15, in contrast to known and in use arrangements wherein each crank arm includes a circular aperture to allow for attachment of a pedal thereto, by means of a fixing member of complementary cross-section, a slot 608 may be provided in each crank arm 600 for receiving such a fixing member for a pedal, this regardless of whether or not the crank arm is of a unitary construction as shown in FIG. 15 or of the two part configuration as shown in FIGS. 13 and 14. The use of a slot 608 rather than a circular aperture, allows for restricted movement of the pedal shaft relative to the crank arm. Means in the form of a shaped lock-up pin (not shown) may be provided for location within the slot 608 of the crank arm 600 as and when desired, to prevent any relative movement between pedal shaft and crank arm. A strain gauge or the like may also be included within the said slot 608 again to allow for measurement of the torque being applied to the crank arm.

Figure 16:
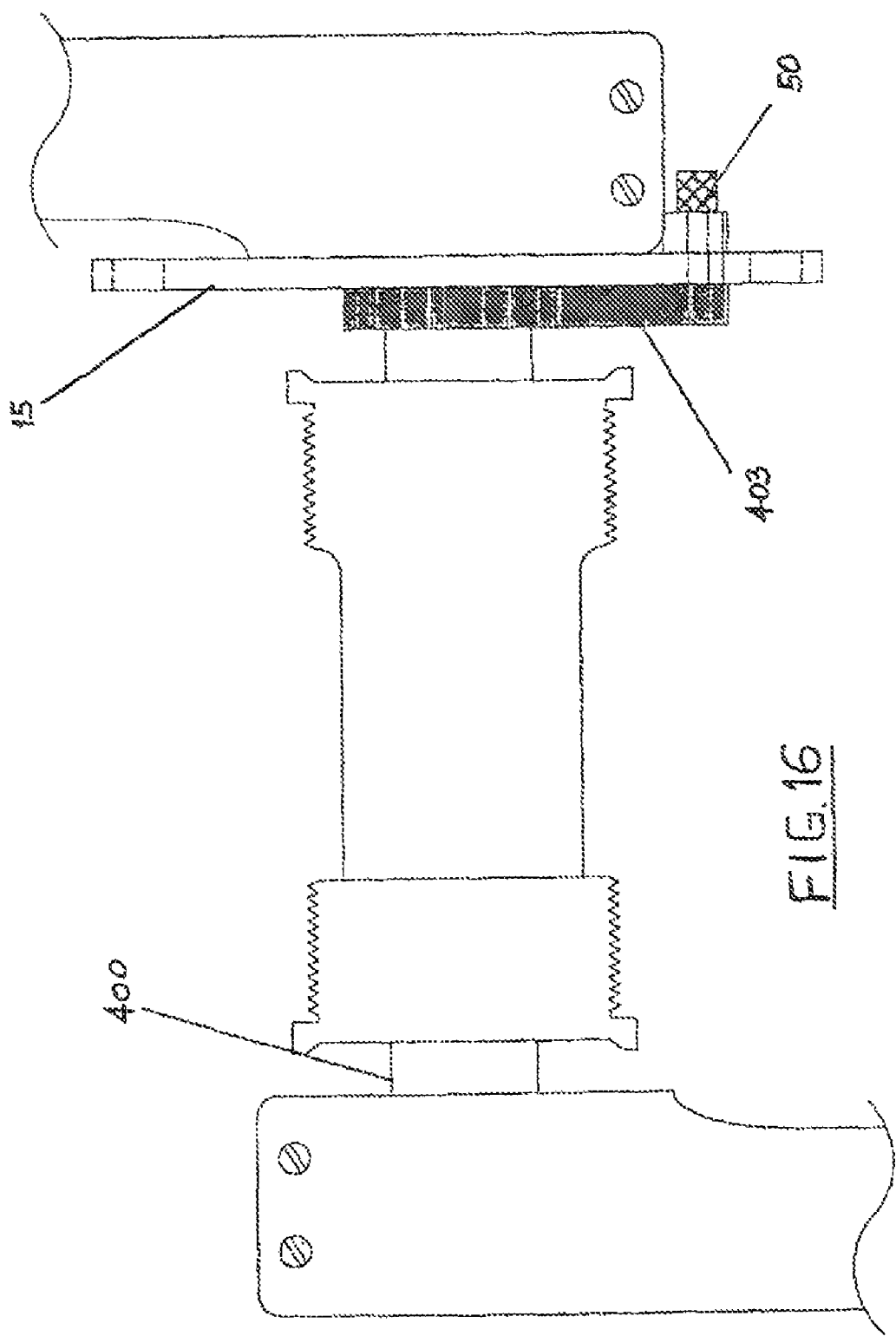
FIG. 16 is an overview of an assembled mechanism in accordance with the embodiments of FIGS. 9 to 12, mounted on a spindle.

With particular reference now to FIG. 16, such shows, schematically, an overview of an assembly in accordance with an especially preferred embodiment of the invention, mounted on a spindle and with the interposition of the spindle and crank adaptor means shown in FIGS. 9 to 12. In use the power take-off means, rather than being fixedly attached to a crankshaft or spindle, is slid over the spindle adaptor means, with respective lugs thereof co-operating whereby to allow for a limited degree of relative rotation therebetween. The crank adaptor means is then slid over the spindle adaptor means, so that the lugs thereof co-operate with the lugs of the power take-off means or spider, so that there is again a limited amount of relative rotation possible therebetween. Once thus assembled, the entire mechanism may be affixed, as for example by bolting, to the right side or end of the associated spindle. The left side crank arm is then bolted (affixed).

The left side or end of the spindle/crankshaft, with the right crank arm then being attached to the splined portion (external surface) of the crank adaptor means. As such, then the power take-off or spider will have limitation rotational capability relative to both the spindle and crank adaptor means.

In the arrangement in FIG. 16 a pin or the like fixing means 50 may be utilized to lock together the assembly.

When compared with known arrangements, the present applicant's arrangements exhibit the following advantages/improvements:

(i) by providing for a controlled amount of relative rotation (between crank members or pedals and power take-off flange/spindle), it accentuates the existence/occurrence of a dead point, allowing the cyclist (even the less experienced) to become aware of such dead points and then to take the appropriate action, which can be expected to result in an improved pedalling technique—or the return to the correct technique—with a consequent increase in speed;

(ii) is extremely simple in design, an hence operation;

(iii) will be readily capable of being manufactured efficiently and cheaply;

(iv) utilizes commercially available bicycle components to a significant extent, in fact for the majority of the implementation/apparatus, which means that only minor adaptation is needed to existing tooling for those parts or components affected by the present invention;

(v) exhibits a minimal increase in weight when compared with conventional products, an important factor in terms of case of operation and operational efficiency;

(vi) is capable of being manufactured to a high level of precision and robustness;

(vii) is applicable to/can be used in all types of bicycle frames;

(viii) does not give rise to any undue increase in size when compared with conventional bottom brackets and crank sets when installed in a bicycle frame;

(ix) requires minimal instruction for the user to gain benefit, but on the other hand can still be used quite normally by users who do not wish to improve their pedalling technique; retains all the conventional characteristics of a bicycle; and (x) is capable of being retro-fitted to an existing, conventional-type bicycle.

As previously advised, a primary objective of the present invention is to improve a cyclist's pedalling technique by alerting that cyclist of the existence of a dead point or dead points. Upon being thus alerted the cyclist can then respond by ensuring that torque is continually applied to each crank arm through every pedal revolution, thereby maximising the forward motion of the bicycle itself and in turn maximising the effectiveness of the applied effort. This capability of continually alerting a cyclist of a dead point is in marked contrast to conventional arrangements and practices, wherein the cyclist has had to rely on his (or her) own senses to detect the fact that his (or her) pedalling is not as proficient and effective as it should be. With a conventional drive mechanism, the need to rely on one's own senses can become difficult since the leg experiencing a dead point is in fact being "carried" by the other leg and/or by the momentum of the overall rotating crank assembly. This can tend to mask the occurrence or existence of a dead point. This difficulty can be expected to increase when the legs become fatigued or when the mind of the cyclist wanders from concentrating on pedalling technique (for whatever reason).

A drive mechanism that is designed to avoid dead points, rather than alert one of the existence thereof, further reduces the ability of the cyclist to sense when such a dead point in fact occurs. The task of detecting a dead point with such a mechanism will also not be helped by the legs speeding up and slowing down with every pedal revolution, especially when the bicycle is travelling at a constant speed. In contrast to this prior art alternative, in accordance with the present invention the cyclist is in fact reminded of the existence of a dead point every time it occurs. Furthermore, and when the cyclist is pedalling properly, the angular velocity of the crank arms will remain constant when the bicycle itself is travelling at constant speed. There have existed other drive mechanisms that have served to alert to the existence of a dead point. These have generally speaking utilised a 1-way clutch arrangement. The present invention exhibits the following advantages over this type of prior art arrangement.

If there exists a dead point in applying torque to a crank arm, then with the prior art drive mechanisms there will be a "backward" rotation of the crank arm relative to the power take-off element. Again with the prior art, when the cyclist seeks to re-apply torque to the crank arm, the clutch mechanism will engage but the crank arms themselves will no longer be diametrically opposite one another. This asymmetry of the crank arms will make further pedaling difficult and inefficient, and to achieve re-alignment would require the cyclist to actually stop pedalling, at least with one leg temporarily. In contrast thereto, with the present applicant's arrangements, and "backward" movement of the crank arm relative to the power take-off element is restricted to the magnitude of the limited degree of rotation within the mechanism itself. With the present applicant's arrangement, when the cyclist senses a dead point and re-applies torque, the crank arms return to being diametrically opposite one another, thereby maximising pedalling efficiency.

Again with the arrangements in accordance with the known art, because a clutch mechanism allows free rotation in a "backward" direction, then a cyclist is unable to free-wheel, when seating or standing, resting both feet on the pedals without both crank arms revolving downwardly, nor is the cyclist able to apply "backward" torque to the crank spindle as would be required with bicycles that have fixed gearing. In contrast thereto, the present applicant's arrangement allow the cyclist to sit or stand, resting both feet on the pedals, and the crank arms will remain diametrically opposite one another plus or minus the limited degree of rotation available in the mechanism itself. A benefit of this is to retain what should be referred to as conventional behaviour of the bicycle, assisting in manoeuvrability, such being essential in situations where the cyclist needs to get off the saddle quickly or control the bicycle in the standing position. Furthermore the bicycle incorporating the present applicant's arrangement can still be operated normally, since the crank arms will remain diametrically opposite one another plus or minus the limited degree of rotation in the mechanism.

The present invention can be used with all types of human-powered machines in all situations. By way of example, in the case of riding a mountain bike or BMX™ off road, where skill and technique is required to jump over obstacles, the arrangements in accordance with the present invention allows such tasks to be performed quite normally, whereas with other drive mechanisms such manoeuvres are difficult, if not impossible. As another example arrangements in accordance with the present invention can be used normally on a tight rope bike, unicycle or human-powered aircraft. With one-way clutch drive mechanisms there is only one direction of drive rotation and, as a result, the operator's safety may be compromised if there is a need for reversing the rotation of the wheel or propeller.

Again with other drive mechanisms which use a one-way clutch, the feet of a cyclist need to be firmly attached to the pedals, as for example by means of a strap or a shoe with a cleat, so that the crank arms can be pulled up. Each crank arm is totally dependent of the other, and therefore the rotation of one has no effect on the other. Because of this a more conventional bike cannot be operated with conventional flat pedals. In contrast thereto, in the arrangement in accordance with the present invention, the crank arms are not totally independent of each other, due to the limited degree of rotation in the mechanism. As a consequence the rotation of one crank arm will cause the other crank arm to rotate, allowing the bicycle to be operated quite normally with conventional flat pedals.

Finally, it is to be realised that the aforegoing description refers merely to a number of preferred embodiments of the present invention, and that variations and modifications will be possible thereto without departing from the spirit and scope of the invention. By way of example only, there are described and illustrated a number of possible mechanical means for achieving the desired interconnection between a crank spindle, power take-off flange/spider and the crank members of a bicycle or the like. It is to be understood, however, that other means present themselves which will allow a limited amount of relative rotational movement, without any axial movement, whereby to accentuate the existence of any dead point and allow the cyclist to readily identify the existence/occurrence of a dead point.

By way of example only, an electronic solution may exist for conventional crank assemblies where torque applied to each crank arm is measured and transmitted to a computer (or the like) which drives an audio-visual display. A function of the computer could be to detect a loss of (reduction in) productive torque being applied to the crank and serve to alert the cyclist of the existence of dead points via the display. In such a system, however, if the cyclist was to sit, or stand, resting his (or her) feet on the pedals, then the computer may interpret such a situation as meaning that the rear crank is experiencing a dead point, hence erroneously giving an audio-visual output.

Such an electronic solution need not employ the principle of the existence or creation of an amount of "play" between a crank member and an associated spindle. One possibility may be to utilise a strain gauge or the like, integrated in any suitable manner with a conventional crank assembly, which allows for detection of a dead point and could even provide a signal (of any known type) to an audio-visual display means (of any given or suitable type).

On a conventional crank system, the retaining bolt fastening the crank to the crank spindle may be loosened off to allow play between the two components. However, trials using this technique have resulted in the mated surfaces of the crank and crank spindle becoming damaged. Also, and from pedalling, the forward and backward motion of the crank on the surface of the retaining bolt causes the bolt to loosen even more, giving rise to further damage to the mated surfaces. Such a procedure can only be applied to the left crank, as it is not integrated with the power take-off element, whereas the right crank is so integrated.

Finally it should be understood that, whilst the preceding description makes particular reference to a number of preferred embodiments of the invention, variations and modifications will be possible thereto without departing from the spirit and scope of the invention, the ambit of which is to be determined from the following claims.

The invention claimed is:

1. An improved power transfer mechanism for use on a human-powered machine, said mechanism being adapted to be drivingly connected to a power take-off device of said machine, said mechanism including: a housing adapted in use, to be disposed within a frame of said human-powered machine; at least one crankshaft adapted to be disposed within said housing; respective left-side and right-side crank arms each adapted to be drivingly associated with an end of said at least one crankshaft; and drive transfer means adapted to co-operate with said at least one crankshaft and each associated crank arm, the arrangement being such that a first member of the group comprising said left-side and right-side crank arms and said power take-off device is adapted to be attached to said at least one crankshaft, such that each of the second and third of said members is adapted to be rotatable relative to said first of said members, and each other, only to a limited and controlled degree, whilst not being movable axially or in a longitudinal direction relative to said at least one crankshaft;

wherein the or each said crankshaft includes a plurality of splines disposed about the circumference of each free end thereof, and wherein each free end of said crankshaft includes a threaded bore disposed substantially centrally thereof, and;

wherein said drive transfer means are in the form of bearing means, one adapted to be interposed between each free end of said crankshaft and an associated crank arm, each bearing means including respective outer and inner casings mounted such that said outer casing is adapted to be rotatable relative to said inner casing to said limited degree, and wherein said inner casing includes a plurality of internal splines adapted, in use, to co-operate with a said splined end of said crankshaft.

2. The mechanism as claimed in claim 1, wherein each crank arm has associated therewith a means for receiving and retaining a pedal.

3. The mechanism as claimed in claim 2, wherein each pedal receiving means is fixedly attached to a respective crank arm, with said left-side and right-side crank arms being connected to said crankshaft in such a way as to enable each said crank arm to be rotatable relative to said crankshaft to said limited angular extent.

4. The mechanism as claimed in claim 3, wherein said limited extent of angular movement is about two degrees (2°).

5. The mechanism as claimed in claim 4, wherein one of said crank arms has a shaped flange or spider associated therewith, and wherein each said crank arm has an aperture extending therethrough, the arrangement being such that said outer casing of each said bearing means is located within said aperture of an associated crank arm in a friction fit.

6. The mechanism as claimed in claim 5, wherein said flange or spider is adapted to be releasably associated with said crankshaft, said flange or spider including a plurality of lugs adapted, in use, to co-operate with complementary lugs provided on one free end portion of said crankshaft.

* * * * *